United States Patent
Shioya

(10) Patent No.: US 7,256,781 B2
(45) Date of Patent: Aug. 14, 2007

(54) IMAGE PROCESSING APPARATUS AND METHOD OF SAME

(75) Inventor: Hiroyuki Shioya, Tokyo (JP)

(73) Assignee: Sony Corporation, Tokyo (JP)

( * ) Notice: Subject to any disclaimer, the term of this patent is extended or adjusted under 35 U.S.C. 154(b) by 453 days.

(21) Appl. No.: 10/672,381

(22) Filed: Sep. 26, 2003

(65) Prior Publication Data

US 2004/0061700 A1    Apr. 1, 2004

(30) Foreign Application Priority Data

Sep. 30, 2002   (JP)   ............. P2002-286326

(51) Int. Cl.
    *G06T 15/00*   (2006.01)
(52) U.S. Cl. ............... 345/426; 345/427; 345/428
(58) Field of Classification Search ........ 345/426–428, 345/419, 423
    See application file for complete search history.

(56) References Cited

U.S. PATENT DOCUMENTS 6,697,066 B2 *   2/2004   Stuttard ............... 345/426
6,858,826 B2 *   2/2005   Mueller et al. .......... 250/208.1

OTHER PUBLICATIONS

Latta et al., Homomorphic Factorization of BRDF-based Lighting Computation, ACM—Transactions on Graphics, Jul. 2002, pp. 509-516.☐☐*
Lawrence et al., Efficient BRDF Importance Sampling Using A Factored Representation, AC< Jun. 2004, pp. 496-505.☐☐*
Kautz et al., Toward Interactive Bump Mapping with Anisotropic Shift-Variant BRDFs, ACM Siggraph & Eurographics, Aug. 2000, pp. 51-58.☐☐*
Kautz et al., Fast, Arbitrary BRDF Shading for Loe-Frequency Lighting Using Spherical Harmonics, Proceedings of 13th Eurographics, Jul. 2002, pp. 291-296, 335.*
Daubert, K. et al., "Efficient Cloth Modeling and Rendering," Proceedings of the 12th Eurographics Workshop on Rendering Techniques, 2001, pp. 63-70.
Kautz, J. et al., "Interactive Rendering with Arbitrary BRDFs using Separable Approximations," Proceedings of the 10th Eurographics Workshop on Rendering, Jun. 1999, pp. 281-292.
LaFortune, E., et al., "Non-Linear Approximation of Reflectance Functions," Proceedings of the 24th annual conference on Computer graphics and interactive techniques, 1997, pp. 117-126.
Malzbender, T. et al., "Polynomial Texture Maps," Proceedings of ACM SIGGRAPH 2001, 2001, pp. 512-528.

* cited by examiner

*Primary Examiner*—Phu K. Nguyen
(74) *Attorney, Agent, or Firm*—Finnegan, Henderson, Farabow, Garrett & Dunner, L.L.P.

(57) ABSTRACT

An image processing apparatus for finding reflectivity based on a BRDF model expressing a ratio of reflection of light incident upon one point of a surface of an object to be drawn at the object surface, the image processing apparatus having an operation unit for calculating the reflectivity based on a BRDF model calculated by a quadratic-form matrix expression including a vector comprised of a light source direction vector, a viewpoint direction vector, and a normal direction vector and a matrix determining the characteristics of the BRDF model, thereby able to achieve both a variety of expression power and good operation efficiency when mounted in a programmable pixel shader and further having enough of a compactness to easily cope with a shift-variant BRDF, and a method of the same.

26 Claims, 16 Drawing Sheets

IMAGE PROCESSING APPARATUS AND METHOD OF SAME

BACKGROUND OF THE INVENTION

1. Field of the Invention

The present invention relates to an image processing apparatus for realizing three-dimensional computer graphics and a method of the same, more particularly relates to a configuration of a computer graphics apparatus and method for generating more realistic images.

2. Description of the Related Art

Along with the increase in operation speeds and improvement of graphic drawing functions in recent computer systems, computer graphics (CG) for preparing and processing graphics and images by using computer resources has been actively researched, developed, and put into practical use.

For example, three-dimensional graphics generates more realistic, three-dimensional-like two-dimensional high definition images by expressing an optical phenomenon when a three-dimensional object is illuminated by a predetermined light source by a mathematical model, applying shading or gradation to the object surface based on this model, and further adhering patterns.

Such computer graphics is now being increasingly actively utilized in CAD/GAM in the field of development in science, engineering, and manufacture and other various fields of applications.

Three-dimensional graphics is generally comprised of a "geometry sub system" positioned at the front end and a "raster sub system" positioned at the back end.

The "geometry sub system" is the step for performing geometricerations on the location, posture, etc. of a three-dimensional object to be displayed on a display screen.

In a geometry sub system, generally an object is handled as a mass of a large number of polygons. "Coordinate conversion", "clipping", "light source computation", and other geometricerations are carried out in units of polygons.

On the other hand, the "raster sub system" is the step of painting pixels composing the object.

Rasterization is realized by interpolating image parameters of all pixels included inside a polygon based on for example the image parameters found for the vertexes of the polygon.

The "image parameters" referred to here include for example color (generated color) data expressed by the so-called RGB format and z-values for expressing a distance in a depth direction.

Further, in recent high definition three-dimensional graphics processing, also an f (fog) for giving a perspective feeling and a texture t for imparting realness by expressing the feeling of a material and the pattern of the object surface etc. are included as image parameters.

Here, processing for generating pixels inside a polygon from vertex information of a polygon is frequently executed using a linear interpolation technique referred to as a "digital differential analyzer" (DDA).

In a DDA process, an inclination of the data to a side direction of the polygon is found from the vertex information, the data on the side is calculated by using this inclination, and then the inclination in the raster scan direction (X-direction) is calculated, and the amount of the change of the parameter found from this inclination is added to the parameter value of the start point of the scanning to thereby generate the internal pixel.

In such three-dimensional graphics, in recent years, in order to generate more realistic computer graphic images, the illumination model has been improved. On the other hand, research and development are being conducted into the hardware architecture for pursuing real time graphic generation performance.

In general, when trying to improve the realness, the amount of operations increases and the real time property is degraded, while when trying to improve the real time property, simplification of the algorithms is required and the realness is sacrificed. Research and development are being conducted to realize these conflicting requirements simultaneously as much as possible.

Among the newest hardware technologies for pursuing real time graphic drawing performance, there is the technology referred to as a "programmable pixel shader".

A programmable pixel shader imparts the function of programmability to the step of shading performed for every pixel composing a polygon.

By this programmability, a general reflection model referred to as a "bi-directional reflection distribution function (BRDF)" has started to be mounted, and the possibility of the real time, realistic image generation has appeared. Further, it has also been considered to change the nature of the BRDF so as to impart change to the color of a polygon surface by texture mapping. Such a BRDF having a different nature according to the location on the surface of the polygon will be referred to as a "shift-variant BRDF".

Below, a detailed explanation will be given of a programmable pixel shader, BRDF, and shift-variant BRDF.

Programmable Pixel Shader

A programmable pixel shader imparts the function of programmability to the step of calculation of luminance performed for every pixel.

The technique of the programmable pixel shader is employed in graphic LSIs of GForce3 and GForce4 of NVIDIA Corp. and RADEON 8500 etc. of ATI Corporation.

Using this, a user can devise and write a pixel shader program to realize a shading model having a realness not achieveable by conventional fixed hardware supporting only gouraud shading in a real time execution environment.

For example, when using not only the techniques of gouraud shading, texture mapping, etc. mounted also in conventional fixed hardware, but also the programmable pixel shader, Phong shading, bump mapping, toon shading, environment mapping, etc. can be mounted. Further, an anisotropic reflection model and a part of kind BRDF can be utilized.

When using a programmable pixel shader, a texture memory can be used as a place for storing shading parameters mapped on a polygon.

For example, when there is a shader program utilizing a normal direction, the data is stored in the normal direction in each texel of the texture memory. At the run time, shading can be calculated by using the normal obtained from the texel value. Bump mapping and partial BRDF have been realized by this method.

The mechanism of the programmable pixel shader of the CForce3 and GForce4 of NVIDIA Corp. is shown in FIG. 1.

Basically, this programmable pixel shader is configured by a texture lookup unit 1 and an ALU 2.

Four texture addresses TEX0 to TEX3 are supplied from an upstream programmable vertex shader to the texture lookup unit 1. The texture lookup unit 1 can look up the texels of four elements of RGBA corresponding to four texture addresses at the maximum. The lookup can be executed for four elements in parallel. The results of the lookup are output to the pixel ALU 2.

Further, the programmable vertex shader supplies four elements of two RGBA to the pixel ALU 2. The pixel ALU 2 has special operation units such as register combiners 2-1, 2-2, and 2-3 as shown in FIG. 2.

The register combiners 2-1 and 2-2 execute inner multiplication and multiplication, while the register combiner 2-3 executes addition. In the pixel ALU 2, the data is input to the register combiner 2-1 through input maps 2-4 and 2-5, and the data is input to the register combiner 2-2 through input maps 2-6 and 2-7. By this, the multiplication and the inner multiplication can be executed in parallel. Note that the inner multiplication is only three-dimension×three-dimension. The inner multiplication operation can be utilized for the inner multiplication of for example the Phong reflection model and the diffuse reflection model.

The pixel shader program is a program of a few steps which can be defined by the user and executed from the header for every pixel. This program controls the texture lookup unit 1 and the ALU 2.

BRDF

BRDF is a function expressing the ratio of the reflection of the light incident upon one point on the surface at the object surface. This is expressed as a four-dimensional function comprised of directions of the light source and the viewpoint as in the following equation:

$$I_o = BRDF(\theta_i, \phi_i, \theta_o, \phi_o) \cos \theta_i I_i \qquad (1)$$

The BRDF can be treated as a higher concept of the conventional well known shading models. For example, the following three lighting effects can be thought of as sub sets of BRDF using directions of the viewpoint and the light source as the parameters.

The ambient lighting model is one of the lighting effects determined independently from the directions of the viewpoint and the light source.

The diffuse reflection model is one of the lighting effects determined according to the direction of the light source.

The specular reflection model is one of the lighting effects determined according to the directions of the light source and the viewpoint.

Other than the above description, a shading model having anisotropy and a retro reflection model for reflecting the light to the direction of the light source etc. can be expressed.

In order to most simply express also a general purpose BRDF, four-dimensional data may be used. However, when trying to utilize it industrially, the cost of realization would be high and therefore this would not be realistic. The formats for expression of the BRDF are roughly classified into those of a physical equation, experiential equation, and approximation equation as shown below.

Physical Equation

This is an equation derived from physical principles. The operation is complex in many cases. For example, this includes a Torrance-Sparrow model, a Oren-Nayar model, etc.

Experiential Equation

This is an equation using compact expressions for reproducing conspicuous characteristics which can be perceived by human beings. Visually definite results are obtained. The processing cost is also low. For example, this includes a Phong shading model, polynomial texture maps (Tom Malzbender et al., "Polynomial Texture Maps", Computer-Graphics (SIGGAPH2001 Proceedings), pp. 519–528), a Lafortune-BRDF (E. P. F. Lafortune et al., "Non-Linear Approximation of Reflectance Functions", ComputerGraphics (SIGGAPH1997 Proceedings), August 1997), etc.

Approximation Value, Approximation Equation

This is an equation using various types of base functions and using tabularized data. It is a method considered to compress the data of a four-dimensional table provided in a general purpose BRDF. For example, it includes a Kauzt-BRDF (J. Kautz et al., "Interactive Rendering with Arbitrary BRDFs using Separable Approximations", Proceedings of the 10th Eurographics Workshop on Rendering, pages 281–292, June 1999) model, Wavelet, BRDF using spherical-harmonics, etc.

The Lafortune-BRDF model is BRDF defined by using a generalized cosine lobe.

$$I = \rho_s [C_x u_x v_x + C_y u_y v_y + C_z u_z v_z]^n \qquad (2)$$

An anisotropic specular effect, retro reflection, off specular effect, etc. can be reproduced.

A polynomial texture map is a shading model specializing in its self shadow effect.

$$I = a_0 l_u^2 + a_1 l_v^2 + a_2 l_u l_v + a_3 l_u + a_4 l_v + a_5 \qquad (3)$$

The parameters of the model can be obtained from a plurality of images captured by using a dedicated measurement device.

A Kauzt-BRDF model is a BRDF model approximating a four-dimensional table by multiplication of two two-dimensional tables by using normalized decomposition. There is mounting using the programmable pixel shader of NVIDIA Corp. The reproducibility of the feeling of a metal and plastic is good. However, two tables are used, so the required amount of data is large.

Shift-Variant BRDF

A BRDF changing according to the location on the surface will be referred to as a "shift-variant BRDF" or "BTF" (hereinafter, standardized as "shift-variant BRDF"). A shift-variant BRDF is a six-dimensional function. It is also possible to consider as if the two-dimensional parameters expressing the location on the surface of the polygon were used in the BRDF.

Since there are different BRDFs at different locations on the surface, a material having a nonuniform texture can be realistically expressed. For example, this is suitable for expressing clothing, fabric, or skin.

With a programmable pixel shader, by holding the parameters of the BRDF model in a circuit similar to texture mapping and looking up the parameters, the BRDF can be changed in units of pixels. Namely, a shift-variant BRDF can be realized.

For example, the Daubert-BRDF (Katja Daubert et al., "Efficient Cloth Modeling and Rendering", in Rendering Techniques, '01 Proceedings of the 12th Eurographics Workshop on Rendering 2001, Springer Verlag, Berlin) experiments with making a shift-variant BRDF of the Lafortune-BRDF model.

However, the Daubert-BRDF only stores the parameters of Lafortune-BRDF equations in the texels for achieving shift-variance. The coordinate system for evaluating Lafortune-BRDF equations is not made shift-variant, so bump map-like expressions are not possible. An effect dependent upon the direction of the viewpoint is realized by using a cube map. In mounting using a cube map, this effect cannot be made shift-variant. Further, the self shadow effect is not considered at all.

A polynomial texture map calculates luminance by using a two-dimensional equation comprised of six terms as in the above equation 3.

This technique aims at replacement of conventional texture mapping. A table storing six coefficients of the terms in the texels may be used. The self shadow effect is a characteristic feature of this.

The programmable pixel shader, BRDF, and shift-variant BRDF explained above suffer from the following disadvantages however.

The programmable pixel shader imparts programmability to the pixel shader—which was conventionally a fixed hardware circuit—and imparts the flexibility of a general purpose operation unit.

However, in order not to detract from the operation efficiency—the sales point of graphics hardware, priority has been given to efficiency in generalization.

There are restrictions, however, such as the fact that branch commands cannot be used, the lack of orthogonality in the command set, and the limitation of the data type to 8 bits.

The programmable pixel shader mounted in the GForce series of NVIDIA Corp. has a circuit configuration assuming a shading model enabling calculation by looking up texels comprised of four elements from a maximum of four texture maps and several inner multiplication operations or multiplication operations for every pixel.

Various shading models can be mounted, but there are also shading models with poor mounting efficiency or unable to be mounted. Particularly, the processing efficiency of a shading model including many matrix operations is poor. Further, only 16 elements can be obtained at the maximum from four texture maps. This is insufficient for a sufficient supply of matrixes.

That is, it is necessary to predict a shading model which may be utilized in the future as correctly as possible and consider the hardware architecture of the programmable pixel shader having a good balance between efficiency and generality.

There are diverse forms of expression of a BRDF. Each has its characteristic features. The application may select the form of expression of the BRDF in accordance with the objective.

However, for graphics hardware designed giving priority to efficiency and considering the minimum generalization, desirably the corresponding BRDF model is the minimum and thereby obtains the maximum effect. A convenient BRDF model satisfying these contradictory requirements is required.

Further, in order to realize a good shift-variant BRDF, a high expression power, compact BRDF model becomes necessary.

The form of expression of a BRDF having a small number of parameters is suited for a shift-variant BRDF. When the number of parameters allocated to one texel is small, the size of the table becomes smaller by that amount. Conversely, when the number of the parameters is large, the table becomes larger, so a BRDF of a type obtained by combining Kauzt-BRDF or other tables is not suited for obtaining a shift-variant BRDF.

SUMMARY OF THE INVENTION

An object of the present invention is to provide an image processing apparatus suitable for a BRDF operation system, able to achieve both a diverse expression power and good operation efficiency when mounted in a programmable pixel shader, and having a compactness enabling easily achievement of a shift-variant BRDF, and a method of the same.

To attain the above object, according to a first aspect of the present invention, there is provided an image processing apparatus for finding reflectivity based on a BRDF model expressing a ratio of reflection of light incident upon one point of a surface of an object to be drawn at the object surface, having an operation means for calculating the reflectivity based on a BRDF model calculated by a quadratic-form matrix expression including a vector comprised of a light source direction vector, a viewpoint direction vector, and a normal direction vector and a matrix determining the characteristics of the BRDF model.

According to a second aspect of the present invention, there is provided an image processing method for finding reflectivity based on a BRDF model expressing a ratio of reflection of light incident upon one point of a surface of a generated object at the object surface, comprising calculating the reflectivity based on a BRDF model calculated by a quadratic-form matrix expression including a vector comprised of a light source direction vector, a viewpoint direction vector, and a normal direction vector and a matrix determining the characteristics of the BRDF model.

Preferably, the vector comprised of the light source direction, the viewpoint direction, and the normal direction is either of a three-dimensional vector expressing directions, a quaternion, and a pole coordinate.

Alternatively, the vector comprised of the light source direction, the viewpoint direction, and the normal direction is obtained by regressing the order by using an appropriate linear conversion.

Alternatively, the vector comprised of the light source direction, the viewpoint direction, and the normal direction is obtained by converting the vector by any elementary operation, table reference, or combination of the same.

Alternatively, the matrix determining the characteristics of the BRDF model calculated by the quadratic-form matrix expression is divided into sub matrixes and operation is performed for evaluation using a polynomial comprised of a quadratic form of the divided sub matrixes.

Alternatively, the quadratic form is calculated by the procedure of multiplying the matrix and vectors, then multiplying the vectors with each other.

Alternatively, evaluation results of one or more of the BRDF models are combined by selectively using addition/subtraction, multiplication, division, cumulative multiplication, and the quadratic form.

Alternatively, the BRDF model is calculated by a composite operator having two operation modes of a matrix operation equation comprised of two different vectors and a sum of the quadratic-form matrix including a triangle matrix and vector multiplication.

Alternatively, the matrix determining the characteristics of the BRDF model is given by using a texture map.

Alternatively, elements of the matrix determining the characteristics of the BRDF model are interpolated based on MIPMAP processing including predetermined filtering.

Alternatively, the matrix determining the characteristics of the BRDF model is referred to from an indexed table.

Alternatively, the matrix determining the characteristics of the BRDF model is obtained by solving an equation comprised of a plurality of polynomials obtained by entering a plurality of BRDF raw data given in advance into the BRDF model.

Alternatively, the matrix determining the characteristics of the BRDF model is formed from the parameters of a polynomial texture map by a correspondence obtained by assuming that a diffuse reflectivity distribution corresponding to the light source direction is the same as a specular reflectivity distribution corresponding to a half vector direction.

That is, according to the present invention, for example the operation means calculates the reflectivity based on a BRDF model calculated by a quadratic-form matrix expression including a vector comprised of a light source direction vector, a viewpoint direction vector, and a normal direction vector and a matrix determining the characteristics of the BRDF model.

BRIEF DESCRIPTION OF THE DRAWINGS

The above and other objects and features of the present invention will be more apparent from the following description of the preferred embodiments given in relation to the attached drawings, wherein.

DESCRIPTION OF THE PREFERRED EMBODIMENTS

Below, a detailed explanation will be given of embodiments of the present invention in relation to the drawings.

In the embodiments, first the configuration and functions of an image processing apparatus employing BRDF model evaluation operation according to the present invention will be explained, then the BRDF model according to the present invention and the operation for evaluation of it will be explained in detail.

Figure 3:
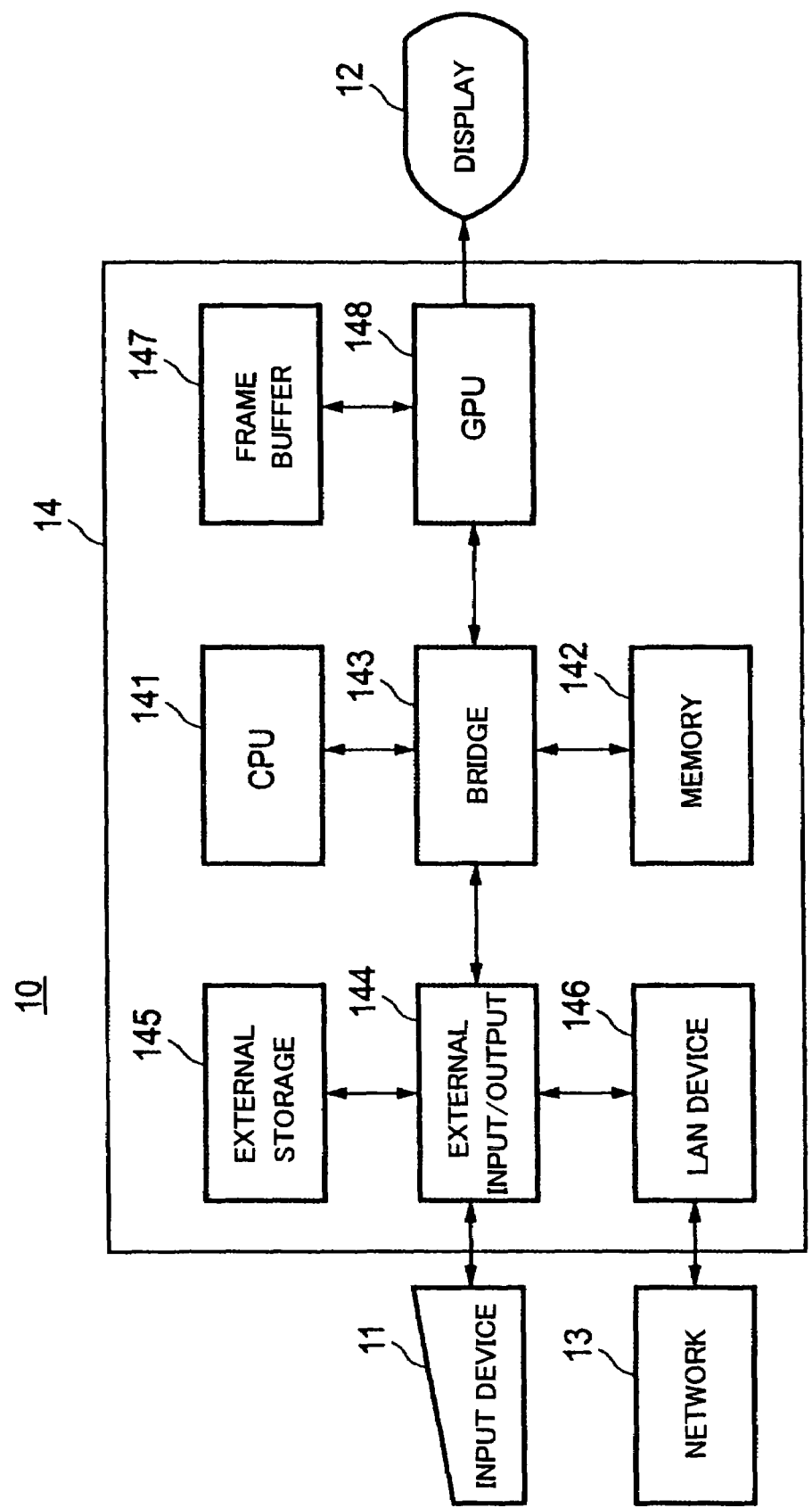
FIG. 3 is a block diagram of an embodiment of an image processing apparatus according to the present invention.

FIG. 3 is a block diagram of an embodiment of the image processing apparatus according to the present invention.

The image processing apparatus 10 has, as shown in FIG. 3, an input device 11, a display 12, a network 13, and a computer 14.

The input device 11 includes an input device such as a keyboard, a mouse, and a joystick and is used by the user for instructing the computer 12 and inputting information.

The display 12 is configured by an image display device such as a cathode ray tube (CRT) or liquid crystal display (LCD) and displays an image in accordance with the image data generated at the computer 14.

The network 13 is comprised of a LAN, the Internet, or other large number of computers connected to each other. The computer 14 transfers data with the outside via the network 13.

The computer 14 has, as shown in FIG. 3, a CPU 141, a memory 142, a bridge unit 143, an external input/output unit 144, an external storage 145, a LAN device 146, a frame buffer 147 and a graphics processor unit (hereinafter, referred to as a GPU) 148.

The CPU 141 controls the entire computer according to a program stored in the memory 142.

The memory 142 is a memory device such as a DRAM or a SRAM for reading and writing of data by the CPU 141 at a high speed and stores programs and data.

The bridge unit 143 is a connection circuit enabling the CPU 141 and the GPU 148 to transfer data with the memory 142 and the external input/output unit 144.

The external input/output unit 144 is an interface for transfer of data with the input device 11 and the external storage 145 and has a USB interface, an IDE interface, a PCI interface, etc.

The external storage 145 is a large capacity storage device for storing programs and data such as a hard disk drive, a CDROM drive, an MO drive, and a memory card.

The LAN device 146 is an interface for connecting an external network and the computer 14. For example, the LAN device 146 includes a modem, an Ethernet (registered trademark) device, etc.

The frame buffer unit 147 has a high speed memory for enabling the GPU 148 to temporarily store image and other data.

The GPU 148 is a device supporting high speed operation of computer graphics. Further, the GPU 148 also works to output image data drawn in the frame buffer unit 147 to the external display device 142.

Figure 4:
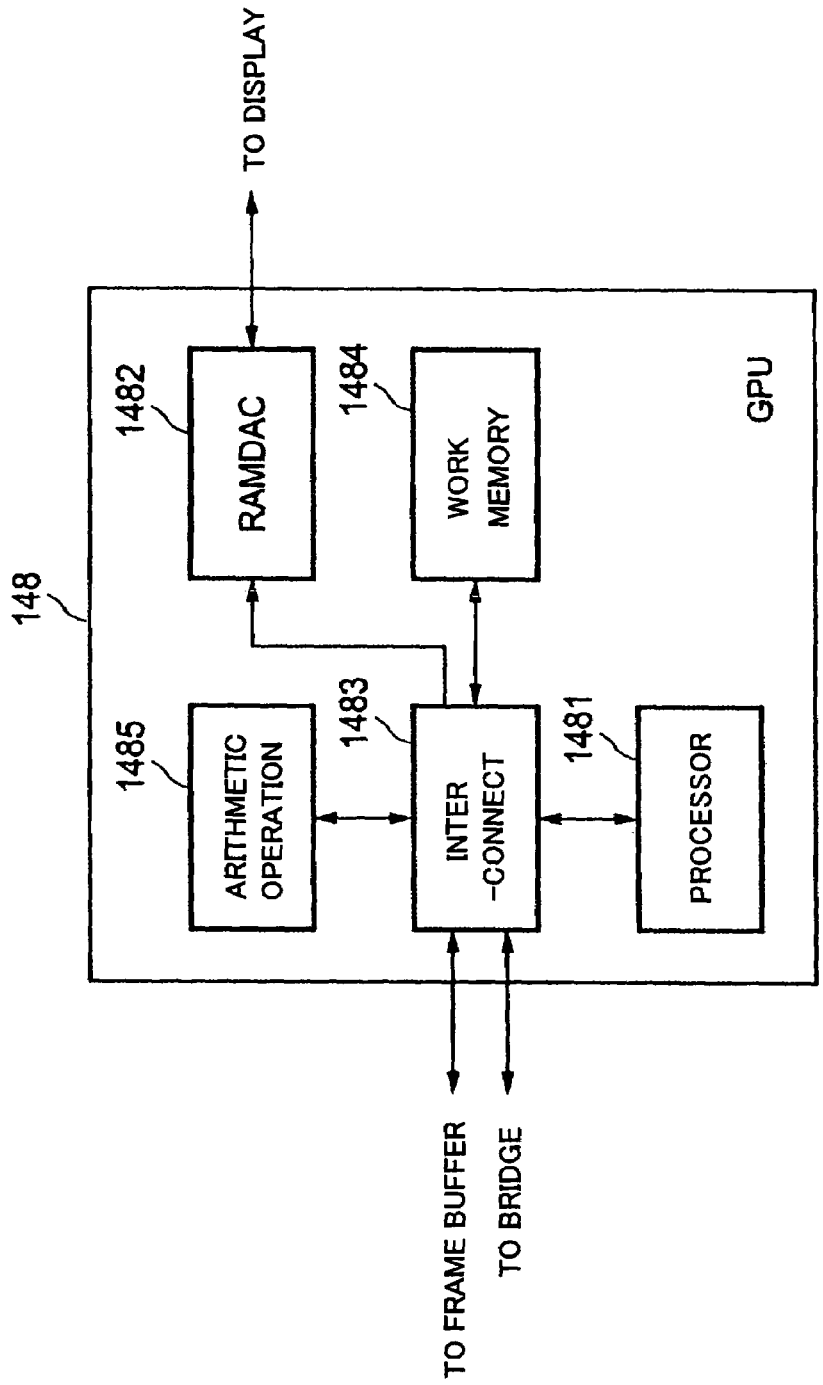
FIG. 4 is a block diagram of a concrete example of the configuration of a GPU of FIG. 3.

FIG. 4 is a block diagram of a concrete example of the configuration of the GPU 148 of FIG. 3.

This GPU 148 has, as shown in FIG. 4, a processor 1481, a RAMDAC 1482, an inter-connect unit 1483, a work memory 1484, and an arithmetic operation unit 1485.

The processor 1481 performs rendering according to the routine received from the CPU 141.

The RAMDAC 1482 converts the image data stored in the frame buffer unit 147 from digital data to analog data for displaying the same on the display 12 and outputs the analog data after the conversion to the display 12.

The inter-connect unit 1483 is a connection circuit for the transfer of data between the internal portion of the GPU 148 (processor 1481, RAMDAC 1482, work memory 1484, and arithmetic operator 1485) and external blocks (frame buffer 147 and bridge unit 143).

The work memory 1484 is a memory used by the processor 1481 and the arithmetic operation unit 1485 and stores programs and the temporary calculation results.

The arithmetic operation unit 1485 has operation units enabling the processor 1481 to efficiently perform operation for evaluation of a BRDF and mounts a composite operator etc.

Figure 5:
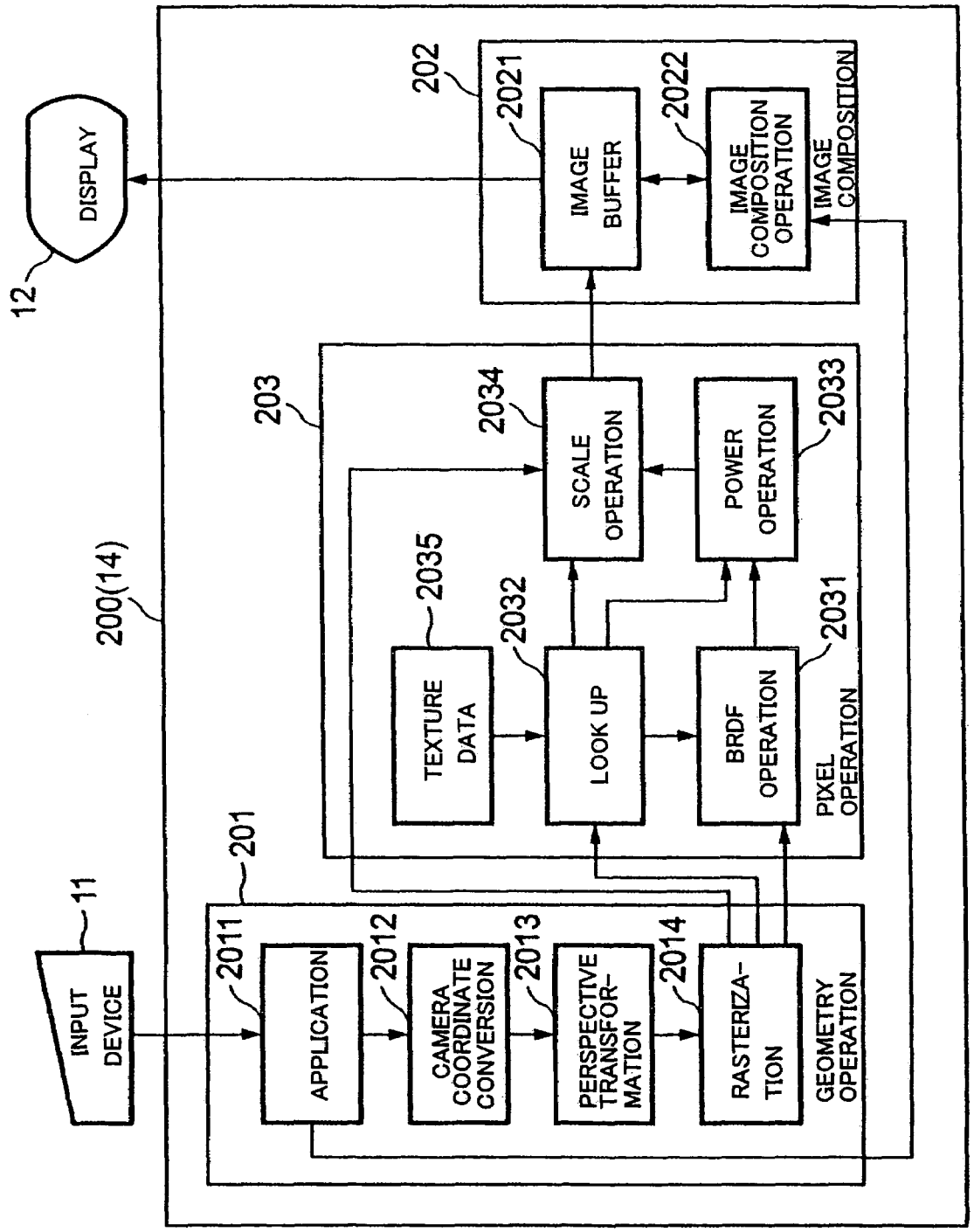
FIG. 5 is a view of an example of the configuration of a logical block constructed by a program stored in a computer according to the present embodiment.

The computer 14 having the above configuration uses a program stored inside the computer 14 to, for example, as shown in FIG. 5, construct inside the computer 14, particularly the CPU 141 and the GPU 148, a logical configuration.

This logical block 200 is roughly configured by three stages as shown in FIG. 5, that is, is configured by a geometric operation unit 201, an image composition unit 202, and a pixel operation unit 203.

The geometric operation unit 201 includes, as shown in FIG. 3, an application unit 2011, a camera coordinate conversion unit 2012, a perspective transformation unit 2013, and a rasterization unit 2014.

The application unit 2011 performs predetermined information processing according to operational information from the input device 11, generates a scene graph comprised of a plurality of polygons, and outputs the same to the camera coordinate conversion unit 2012 and the image composition unit 202.

The camera coordinate conversion unit 2012 converts the coordinates of the polygons to a coordinate system based on the coordinates of a virtual camera and outputs the same to the perspective transformation unit 2013.

The perspective transformation unit 2013 projects the coordinates of the polygons to a two-dimensional projection plane of the virtual camera.

The rasterization unit 2014 breaks down each polygon to pixels matching with the resolution characteristic of the display 12 and outputs the same to the pixel operation unit 203.

The image composition unit 202 includes, as shown in FIG. 5, an image buffer 2021 and an image composition operation unit 2022.

The image buffer 2021 is a memory used for storing and holding images generally referred to as a frame buffer and temporarily holds the data of the operation results of the pixel operation unit 203, the operation results of the image composition operation unit 2022, and the data to be displayed on the display 12.

The image composition operation unit 2022 performs image composition such as weighted composition of images with respect to the image data stored in the image buffer 2021 (for example refer to Foley, COMPUTER GRAPHICS principles and practice, pp. 835, Section 17.6: Image Compositing). The pixel operation unit 203 performs the lighting calculations for each pixel based on the information prepared at the rasterization unit 2014 by operations executed for every pixel, i.e., a smaller unit than that of a polygon.

The pixel operation unit 203 includes, as shown in FIG. 5, a BRDF operation unit 2031, a lookup unit 2032, a power operation unit 2033, a scale operation unit 2034, and a texture map 2035.

The BRDF operation unit 2031 evaluates and processes the BRDF model according to the present invention defined using the quadratic-form mentioned in detail later as follows:

$$\text{quad}BRDF(L, V, N; M) = LM_{11}L + VM_{22}V + LM_{21}V + \tag{4}$$
$$LM_{31}N + VM_{32}N + NM_{33}N =$$

$$t\begin{bmatrix} L_x \\ L_y \\ L_z \end{bmatrix} \begin{bmatrix} m_{11} & m_{12} & m_{13} \\ 0 & m_{22} & m_{23} \\ 0 & 0 & m_{33} \end{bmatrix} \begin{bmatrix} L_x \\ L_y \\ L_z \end{bmatrix} +$$

$$t\begin{bmatrix} V_x \\ V_y \\ V_z \end{bmatrix} \begin{bmatrix} m_{44} & m_{45} & m_{46} \\ 0 & m_{55} & m_{56} \\ 0 & 0 & m_{66} \end{bmatrix} \begin{bmatrix} V_x \\ V_y \\ V_z \end{bmatrix} +$$

$$t\begin{bmatrix} L_x \\ L_y \\ L_z \end{bmatrix} \begin{bmatrix} m_{14} & m_{15} & m_{16} \\ m_{24} & m_{25} & m_{26} \\ m_{34} & m_{35} & m_{36} \end{bmatrix} \begin{bmatrix} V_x \\ V_y \\ V_z \end{bmatrix} +$$

$$t\begin{bmatrix} L_x \\ L_y \\ L_z \end{bmatrix} \begin{bmatrix} m_{19} \\ m_{29} \\ m_{39} \end{bmatrix} + t\begin{bmatrix} V_x \\ V_y \\ V_z \end{bmatrix} \begin{bmatrix} m_{49} \\ m_{59} \\ m_{69} \end{bmatrix} +$$

$$m_{99}$$

Here, L and V indicate vectors representing the directions of the light source and the viewpoint input from the rasterization unit 2014. N indicates a vector of (0, 0, 1) representing the direction of the normal. M indicates a parameter representing the nature of the BRDF according to the present invention input from the lookup unit 2032.

When all elements of the sub matrix are 0, the value of the term will clearly become 0. At that time, the operations for that term can be omitted.

Further, when a composition operation unit is used, $LM_{21}V$, $(LM_{11}L+LM_{31}N)$, and $(VM_{22}V+VM_{32}N)$ can be computed at about the same cost. Due to this, improvement of the efficiency of utilization of hardware resources is achieved.

The lookup unit 2032 looks up the parameters corresponding to the pixels from the texture map 2035 according to addresses input from the rasterization unit 2014. The obtained parameters are used as parameters of the function operations to be performed at the BRDF operation unit 2031, the power operation unit 2033, and the scale operation unit 2034.

In the present embodiment, as will be explained in detail later, in order to handle a BRDF having an expression-hard to reproduced by a single BRDF according to the present invention, the evaluation value of the BRDF operation unit 2031 is changed at the power operation unit 2033 and the scale operation unit 2034.

The power operation unit 2033 cumulatively multiplies the evaluation values input from the BRDF operation unit 2031 as in the following equation:

$$\text{Power} = \text{quad}BRDF^{(1/\text{glossiness})} \tag{5}$$

The scale operation unit 2034 performs an operation for multiplying a value "Power" input from the power operation unit 2033, an intensity "LightIntensity" of the light source input from the rasterizer 2014, and a reflectivity "Reflectivity" for each of RGB input from the lookup unit 2032 as in the following equation:

$$ResultIntensity_R = Reflectivity_R \cdot LightIntensity_R \cdot Power \tag{6}$$

$$ResultIntensity_G = Reflectivity_G \cdot LightIntensity_G \cdot Power$$

$$ResultIntensity_B = Reflectivity_B \cdot LightIntensity_B \cdot Power$$

The scale operation unit 2034 writes the "ResultIntensity" obtained based on equation 6 into the image buffer 2021.

The data written in the image buffer 2021 is combined by the image composition operation at the image composition operation unit 2022. By this processing, one polygon is generated a plurality of times while changing the shading parameter by multi-path rendering and the results are combined to obtain the intended shading result image.

Figure 6:
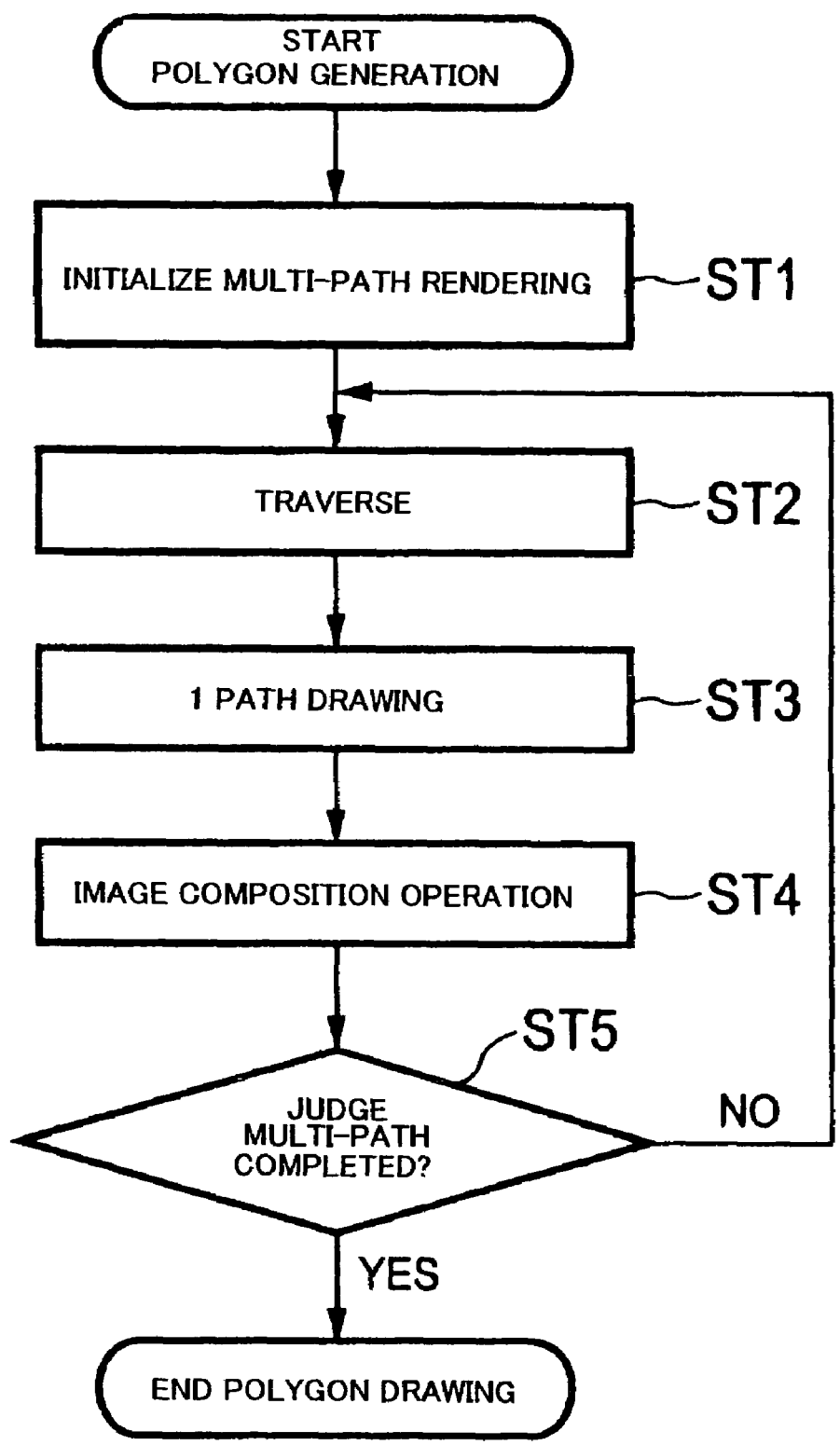
FIG. 6 is a flow chart for explaining an example of the operation using an image combiner.
Figure 7:
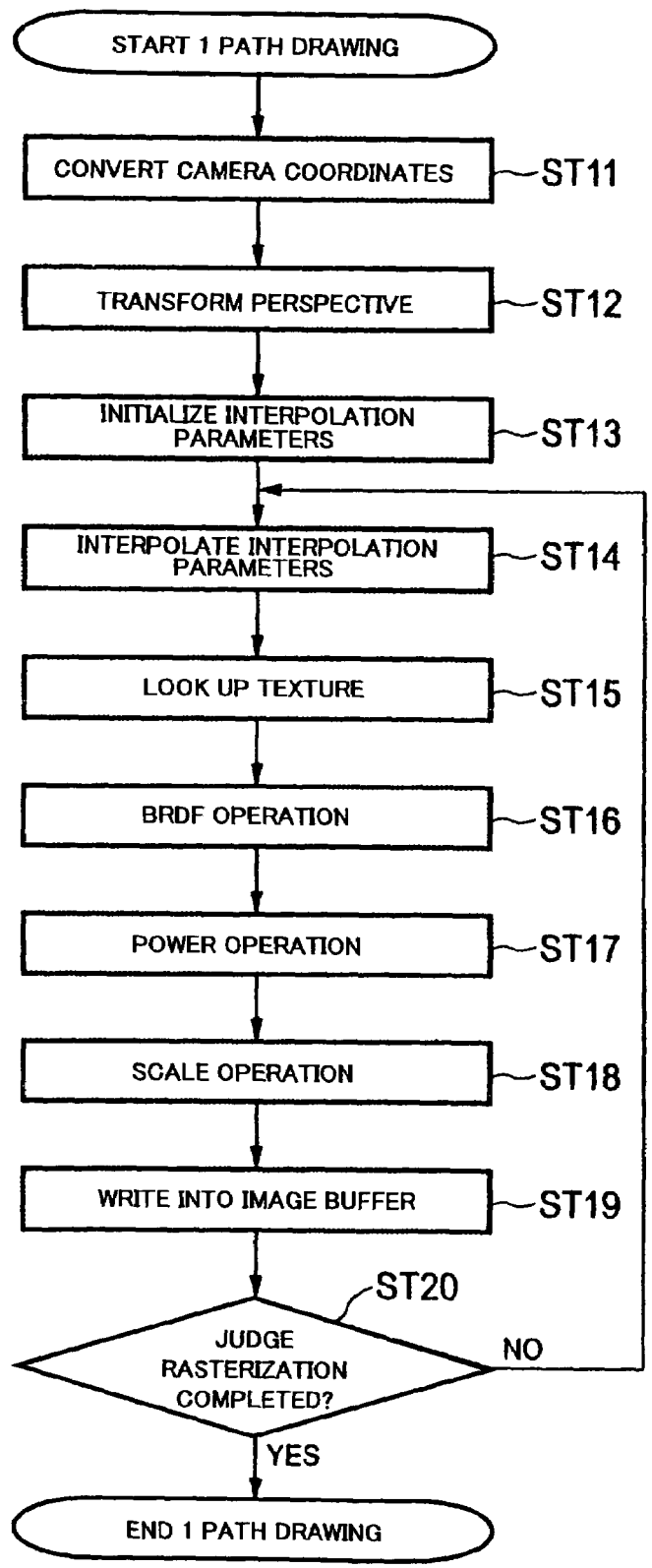
FIG. 7 is a flow chart for explaining the detailed routine for one-path drawing at step ST3 of FIG. 6.

Next, an explanation will be given of an example of the operation when an image composition unit is utilized in relation to the flow charts of FIG. 6 and FIG. 7. Utilizing the image composition unit of the present embodiment and the technique generally referred to as multi-path rendering, one polygon is rendered a plurality of times and the rendered results are combined in accordance with the image compositing technique to draw one polygon.

This routine will be explained by referring to the flow chart of FIG. 6.

Step ST1: Multi-Path Rendering Initialization

First, at step ST1, the initialization required for the multi-path rendering is carried out. For example, the data of the image buffer where the polygon is to be generated is erased and an image graph expressing the graphic generation routine and work contents is set.

Step ST2: Traverse

At step ST2, the image graph is traversed and the graphic drawing of one path is set up.

Step ST3: One Path Drawing

At step ST3, the geometric operation unit 201 and the pixel operation unit 203 generate one path's worth of polygons in the image buffer 2021.

Step ST4: Image Composition

At step ST4, the polygons drawn in the present step or the previous step are combined or the required image processing is carried out.

Step ST5: Judgment of Multi-path Completion

At step ST5, it is judged if all paths' worth of the graphics drawing were completed. In the multi-path completion judgment, if in the middle, the processing routine returns to the processing from step ST2, where the next path is set up, then the processing is continued until the multi-path rendering is finally completed.

In the above routine, the detailed routine for the drawing of one path's worth of graphics at step ST3 becomes as shown in FIG. 5.

Step ST11: Camera Coordinate Conversion

First, at step ST11, the polygons of the model coordinate system are converted to the camera coordinate system by the camera coordinate conversion unit 2012.

Step ST12: Perspective Transformation

At step ST12, the polygons are projected to the screen coordinates by the perspective transformation unit 2013.

Step ST13: Initialization of Interpolation Parameters

At step ST13, the rasterization unit 2014 initially sets the texture address, the light source direction, the viewpoint direction, and other values found by interpolation for pixels inside a polygon.

Step ST14: Interpolation of Interpolation Parameters

Next, at step ST14, the rasterization unit 2014 finds the texture address, the light source direction, the viewpoint direction, etc. by interpolation for every pixel.

Step ST15: Texture Look Up

At step ST15, the lookup unit 2032 looks up the value of the texels from the texture data according to the texture address.

Step ST16: BRDF Calculation

Next, at step ST16, the BRDF operation unit 2031 performs operation to evaluate the BRDF model according to the present invention.

Step ST17: Power Operation

At step ST17, the power operator 2033 raises the evaluation result obtained at the previous step ST16 to the power.

Step ST18: Scale Operation

At step ST18, the scale operation unit 2034 scales the result obtained at the previous step ST17.

Step ST19: Writing into Image Buffer

At step ST19, the results obtained at the previous step ST18 are written into the image buffer 2021.

Step ST20: Judgment of Completion of Rasterization

At step ST20, it is judged whether or not the rasterization is completed. The processing from step ST14 is repeated until all pixels in all polygons are drawn.

Next, a detailed explanation will be given of the BRDF model according to the present invention and the operation for evaluation of it.

BRDF Modeling Using Quadratic Form

In the present embodiment, the BRDF is modeled as follows by using the quadratic form (hereinafter this model will be referred to as the "BRDF model of the present invention").

$$\text{quad}BRDF(L, V, N; M) = {}^t\begin{bmatrix} L \\ V \\ N \end{bmatrix} \begin{bmatrix} M_{11} & M_{21} & M_{31} \\ 0 & M_{22} & M_{32} \\ 0 & 0 & M_{33} \end{bmatrix} \begin{bmatrix} L \\ V \\ N \end{bmatrix} \quad (7)$$

Here, the matrix M is a parameter for determining the characteristics of the BRDF model of the present invention. Due to the nature of the equation, any M can be simplified to a symmetric matrix or a triangle matrix. Further, L indicates the vector representing the light source direction in a surface coordinate system. V indicates the vector representing the viewpoint direction in the surface coordinate system. N indicates the vector representing the normal direction in the surface coordinate system.

The BRDF model of the present invention uses a vector [LVN] comprised of arranging the above L, V, and N.

For example, each L, V, N may be a three-dimensional unit vector representing the direction of each. This can be concretely written as follows:

$$\text{quad}BRDF(L, V, N; M) = {}^t\begin{bmatrix} L \\ V \\ N \end{bmatrix} \begin{bmatrix} M_{11} & M_{21} & M_{31} \\ 0 & M_{22} & M_{32} \\ 0 & 0 & M_{33} \end{bmatrix} \begin{bmatrix} L \\ V \\ N \end{bmatrix} \quad (8)$$

-continued $$t\begin{bmatrix}L_x\\L_y\\L_z\\V_x\\V_y\\V_z\\0\\0\\1\end{bmatrix}\begin{bmatrix}m_{11}&m_{12}&m_{13}&m_{14}&m_{15}&m_{16}&m_{17}&m_{18}&m_{19}\\0&m_{22}&m_{23}&m_{24}&m_{25}&m_{26}&m_{27}&m_{28}&m_{29}\\0&0&m_{33}&m_{34}&m_{35}&m_{36}&m_{37}&m_{38}&m_{39}\\0&0&0&m_{44}&m_{45}&m_{46}&m_{47}&m_{48}&m_{49}\\0&0&0&0&m_{55}&m_{56}&m_{57}&m_{58}&m_{59}\\0&0&0&0&0&m_{66}&m_{67}&m_{68}&m_{69}\\0&0&0&0&0&0&m_{77}&m_{78}&m_{79}\\0&0&0&0&0&0&0&m_{88}&m_{89}\\0&0&0&0&0&0&0&0&m_{99}\end{bmatrix}\begin{bmatrix}L_x\\L_y\\L_z\\V_x\\V_y\\V_z\\0\\0\\1\end{bmatrix}$$

Further, each L, V, and N may be a vector represented by using other vector space too. For example, it is also possible to use a general coordinate system such as a pole coordinate system or quaternion. It is also possible to use another special coordinate system.

Further, it is also possible to regress the order using an appropriate linear conversion. Other than this, it is possible to use any elementary processing or table reference or combination of the same to convert these vectors. In the following example, use is made of a model obtained by regressing L and V of the three-dimensional vector to two dimensions and a model obtained by converting N to the constant 1.

$$\text{quad}(L,V,N;M) = t\begin{bmatrix}L_x\\L_y\\V_x\\V_y\\1\end{bmatrix}\begin{bmatrix}m_{11}&m_{12}&m_{14}&m_{15}&m_{19}\\0&m_{22}&m_{24}&m_{25}&m_{29}\\0&0&m_{44}&m_{45}&m_{49}\\0&0&0&m_{55}&m_{59}\\0&0&0&0&m_{99}\end{bmatrix}\begin{bmatrix}L_x\\L_y\\V_x\\V_y\\1\end{bmatrix} \quad (9)$$

Details of Calculation Method

In the BRDF model of the present invention, it is also possible to divide the matrix representing the parameters of the model into sub matrixes as follows and perform the processing for evaluation using a polynomial comprised of these sub matrixes.

$$\text{quadBRDF}(L,V,N;M) = LM_{11}L + VM_{22}V + LM_{21}V + LM_{31}N + VM_{32}N + NM_{33}N \quad (10)$$

If the sub matrix $M_{nn}$ is a zero matrix, the value of the term thereof clearly becomes 0. That is, the calculation of that term can be omitted. In actual mounting, it is more efficient to mount just the required terms.

In the next matrix expression, if calculated as follows, the number of the required multipliers can be reduced.

$$LM_{21}V = t\begin{bmatrix}L_x\\L_y\\L_z\end{bmatrix}\begin{bmatrix}m_{14}&m_{15}&m_{16}\\m_{24}&m_{25}&m_{26}\\m_{34}&m_{35}&m_{36}\end{bmatrix}\begin{bmatrix}V_x\\V_y\\V_z\end{bmatrix} = \quad (11)$$

$$L_x(m_{14}V_x + m_{15}V_y + m_{16}V_z) +$$
$$L_y(m_{24}V_x + m_{25}V_y + m_{26}V_z) +$$
$$L_z(m_{34}V_x + m_{35}V_y + m_{36}V_z)$$

After multiplication of the matrix and the vectors, calculation is possible by the routine of multiplying the vectors. This results in 12 multiplication operations and eight addition operations.

On the other hand, the equation can also become a format expanding the terms as follows. In this case, 18 multiplication operations and eight addition operations become necessary.

$$LM_{21}V = m_{14}L_xV_x + m_{15}L_xV_y + m_{16}L_xV_z + m_{24}L_yV_x + m_{25}L_yV_y + m_{26}L_yV_z + m_{34}L_zV_x + m_{35}L_zV_y + m_{36}L_zV_z \quad (12)$$

As a result, it is more efficient to perform the calculation by the former (equation 11) method.

As described above, the BRDF of the present invention is comprised of only product-sum operations. Further, since this is an equation comprised of vectors and a matrix, efficient processing is possible.

Shading Effect of BRDF of Present Invention

The shading effect of the BRDF of the present invention is determined according to the parameters M. Below, an explanation will be given of the correspondence between the shading effect and the parameters.

0 in the parameters M is a zero matrix. $M_{nn}$ is a sub matrix wherein at least one element is not 0.

The "ambient lighting effect" is an effect independent of the light source direction and the viewpoint direction. The "diffuse reflection effect" is an effect dependent upon the light source direction and independent from the viewpoint direction. The "specular reflection effect" is an effect dependent upon the light source direction and the viewpoint direction. Each can be expressed by the parameters M having one or more sub matrixes not zero matrixes as follows.

Ambient Lighting Effect Parameter $$M = \begin{bmatrix}0&0&0\\0&0&0\\0&0&M_{33}\end{bmatrix} \quad (13)$$

Diffuse Reflection Effect Parameter $$M = \begin{bmatrix}0&0&M_{31}\\0&0&0\\0&0&0\end{bmatrix} \quad (14)$$

Specular Reflection Effect Parameter $$M = \begin{bmatrix} 0 & M_{21} & 0 \\ 0 & 0 & 0 \\ 0 & 0 & 0 \end{bmatrix} \quad (15)$$

Light Source Direction Dependent Effect Parameter $$M = \begin{bmatrix} M_{11} & 0 & M_{31} \\ 0 & 0 & 0 \\ 0 & 0 & 0 \end{bmatrix} \quad (16)$$

Viewpoint Direction Dependent Effect Parameter $$M = \begin{bmatrix} 0 & 0 & 0 \\ 0 & M_{22} & M_{32} \\ 0 & 0 & 0 \end{bmatrix} \quad (17)$$

Total Effect Parameter $$M = \begin{bmatrix} M_{11} & M_{21} & M_{31} \\ 0 & M_{22} & M_{32} \\ 0 & 0 & M_{33} \end{bmatrix} \quad (18)$$

Correspondence with Conventional Model

The BRDF of the present invention has effects including the conventionally well known shading models.

Below, a description will be given of the correspondence between the expressions of the conventional models and details of the parameters in the BRDF of the present invention.

Ambient Lighting Model $k_a$ $$M = \begin{bmatrix} 0 & 0 & 0 \\ 0 & 0 & 0 \\ 0 & 0 & M_{33} \end{bmatrix} \left( \text{where } M_{33} = \begin{bmatrix} 0 & 0 & 0 \\ 0 & 0 & 0 \\ 0 & 0 & k_a \end{bmatrix} \right) \quad (19)$$

Diffuse Reflection Model $k_d$ (N·L)

$$M = \begin{bmatrix} 0 & 0 & M_{31} \\ 0 & 0 & 0 \\ 0 & 0 & 0 \end{bmatrix} \left( \text{where } M_{31} = \begin{bmatrix} 0 & 0 & 0 \\ 0 & 0 & 0 \\ 0 & 0 & k_d \end{bmatrix} \right) \quad (20)$$

Phong Reflection Model $k_s$ (V·L)$^n$
(raise evaluation results of BRDF of present invention to n-th power matching with n-th power of Phong model)

$$M = \begin{bmatrix} 0 & M_{21} & 0 \\ 0 & 0 & 0 \\ 0 & 0 & 0 \end{bmatrix} \left( \text{where } M_{21} = \begin{bmatrix} -k_s & 0 & 0 \\ 0 & -k_s & 0 \\ 0 & 0 & k_s \end{bmatrix} \right) \quad (21)$$

Lafortune-BRDF
$\rho_s [C_x u_x v_x + C_y u_y v_y + C_z u_z v_z]^n$: (raise evaluation result of BRDF of present invention to n-th power and multiply by $\rho_s$ matching with n-th power and $\rho_s$ multiplication of Lafortune-BRDF).

$$M = \begin{bmatrix} 0 & M_{21} & 0 \\ 0 & 0 & 0 \\ 0 & 0 & 0 \end{bmatrix} \left( \text{where } M_{21} = \begin{bmatrix} C_x & 0 & 0 \\ 0 & C_y & 0 \\ 0 & 0 & C_z \end{bmatrix} \right) \quad (22)$$

Polynomial Texture Map
$a_0 l_u^2 + a_1 l_v^2 + a_1 l_u l_v + a_3 l_u + a_4 l_v + a_5$:

$$M = \begin{bmatrix} M_{11} & 0 & M_{31} \\ 0 & 0 & 0 \\ 0 & 0 & M_{33} \end{bmatrix} \left( \text{where } M_{11} = \begin{bmatrix} a_0 & a_2 & 0 \\ 0 & a_1 & 0 \\ 0 & 0 & 0 \end{bmatrix}, \right. \quad (23)$$

$$\left. M_{31} \begin{bmatrix} 0 & 0 & a_3 \\ 0 & 0 & a_4 \\ 0 & 0 & 0 \end{bmatrix} M_{33} = \begin{bmatrix} 0 & 0 & 0 \\ 0 & 0 & 0 \\ 0 & 0 & a_5 \end{bmatrix} \right)$$

As described above, if using the BRDF of the present invention, it is possible to realize a model equivalent to conventional shading models by suitably setting the parameters and to express their effects. Further, it is also possible to manifest combined effects by combining these settings or effects including these effects.

Case Where Viewpoint Direction Dependent Effect Is Unnecessary

When a viewpoint direction dependent effect is unnecessary, the BRDF of the present invention can be modified as follows:

$$quadBRDF(L, V, N; M) = \begin{bmatrix} L \\ N \end{bmatrix}^1 \begin{bmatrix} M_{11} & M_{21} & M_{31} \\ 0 & 0 & M_{33} \end{bmatrix} \begin{bmatrix} L \\ V \\ N \end{bmatrix} \quad (24)$$

The above equation includes at least the effects able to be expressed by the two models of the conventional Lafortune-BRDF and polynomial texture maps. The fact that $M_{21}$ corresponds to Lafortune-BRDF, and $M_{11}$, $M_{31}$, and $M_{33}$ correspond to polynomial texture maps was explained before. It is seen that the parameter matrix M stands from the set of sub matrixes of these two models. In addition, sub matrixes corresponding to these models occupy locations exclusive of each other. Therefore, it can be considered that the effects are independent from each other. That is, this modified BRDF of the present invention has at least effects including complementary effects possessed by the polynomial texture maps and the Lafortune-BRDF and has characteristics enabling independent control of these effects.

Method for Coping with BRDF Having Expression Hard to Reproduce by Single BRDF of Present Invention For a BRDF having an expression hard to reproduce by a single BRDF of the present invention, it is possible to combine the evaluation results of one or more BRDFs of the present invention by various operations to create the intended BRDF.

Figure 8:
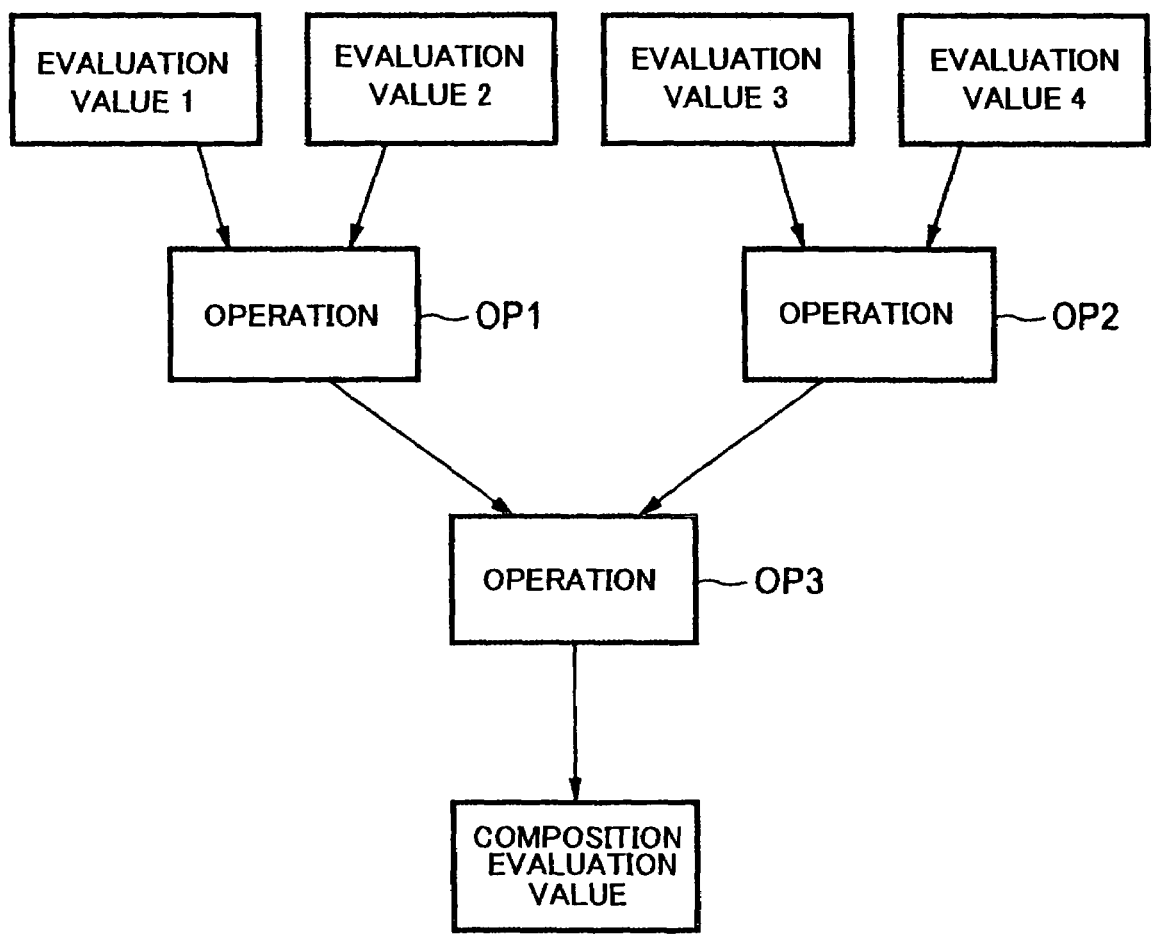
FIG. 8 is a view for explaining a method for handling a BRDF having an expression hard to reproduce by a single BRDF of the present invention.

For example, a tree is created using the outputs of the BRDFs of the present invention as the terminal nodes and, as shown in FIG. 8, using various operation units OP1 to OP3 as intermediate nodes, and the output of the root node is used as the value of the intended BRDF. For the operation units OP1 to OP3, addition/subtraction, multiplication, division, cumulative multiplication, quadratic-form, and other operation units are selectively used.

For example, when desiring to control the directivity of specular reflection used in Phong shading and Lafortune-BRDF, the evaluation result of the BRDF of the present invention may be raised to the $n^{-1}$ power (or raised to the n-th power) as follows:

$$I = a \cdot (quadBRDF(L,V))^{b/n} \qquad (25)$$

When desiring to more clearly bring out the self shadow or view dependent effect, it is possible to multiply the evaluation results of BRDF models of the present invention having different parameters as follows:

$$I = quadBRDF(L,V,N;M_1) \cdot quadBRDF(L,V,N;M_2) \qquad (26)$$

Further, it is also possible to use the 22nd order format matrix operator used in the evaluation of the BRDF model of the present invention. As shown in the following equation, it is also possible to combine the evaluation results of different BRDF models of the present invention.

$$BRDF_1(quadBRDF_2 \cdot quadBRDF_3) = \qquad (27)$$

$$^1\begin{bmatrix} quadBRDF_2 \\ quadBRDF_3 \\ 1 \end{bmatrix} \begin{bmatrix} k_{11} & k_{21} & k_{31} \\ 0 & k_{22} & k_{32} \\ 0 & 0 & k_{33} \end{bmatrix} \begin{bmatrix} quadBRDF_2 \\ quadBRDF_3 \\ 1 \end{bmatrix}$$

Here, $quadBRDF_2$ and $quadBRDF_3$ indicate the evaluation results of different BRDF models of the present invention, and $BRDF_1$ indicates the combined result thereof.

Simultaneous Calculation of Triangle Matrix and Matrix

In order to efficiently perform the operation for evaluation of the BRDF of the present invention, as already explained, it is possible to use a format breaking down the BRDF of the present invention into a plurality of terms comprised of sub matrixes as follows.

$$quadBRDF(L,V,N;M) = LM_{11}L + VM_{22}V + LM_{21}V + LM_{31}N + VM_{32}N + NM_{33}N \qquad (28)$$

Among these, $LM_{21}V$, $(LM_{11}L+LM_{31}N)$, and $(VM_{22}V+VM_{32}N)$ can be calculated by a combination of the same amount of operation units. Therefore, when forming a composition operation unit able to selectively perform these three types of operation, the mount efficiency is good.

Let us look at the above three types of operations in detail.

First, the matrix operation $LM_{21}V$ comprised of the following two different vectors is comprised of 12 multiplication operations and eight addition operations.

$$LM_{21}V = {}^1\begin{bmatrix} L_x \\ L_y \\ L_y \end{bmatrix} \begin{bmatrix} m_{14} & m_{15} & m_{16} \\ m_{24} & m_{25} & m_{26} \\ m_{34} & m_{35} & m_{36} \end{bmatrix} \begin{bmatrix} V_x \\ V_y \\ V_z \end{bmatrix} \qquad (29)$$

$$= L_x(m_{14}V_x + m_{15}V_y + m_{16}V_z) +$$
$$L_y(m_{24}V_x + m_{25}V_y + m_{26}V_z) +$$
$$L_z(m_{34}V_x + m_{35}V_y + m_{36}V_z)$$

Next, a sum $(LM_{11}L+LM_{31}N)$ of the quadratic-form matrix and vector multiplication comprised of the next triangle matrix becomes an operation comprised of 12 multiplication operations and eight addition operations obtained by adding two terms comprised of nine multiplication operations and five addition operations and three multiplication operations and two addition operations:

$$LM_{11}L + LM_{31}N = {}^t\begin{bmatrix} L_x \\ L_y \\ L_z \end{bmatrix} \begin{bmatrix} m_{11} & m_{12} & m_{13} \\ 0 & m_{22} & m_{23} \\ 0 & 0 & m_{33} \end{bmatrix} \begin{bmatrix} L_x \\ L_y \\ L_z \end{bmatrix} + \qquad (30)$$

$$^t\begin{bmatrix} L_x \\ L_y \\ L_z \end{bmatrix} \begin{bmatrix} 0 & 0 & m_{19} \\ 0 & 0 & m_{29} \\ 0 & 0 & m_{39} \end{bmatrix} \begin{bmatrix} 0 \\ 0 \\ 1 \end{bmatrix}$$

$$= {}^t\begin{bmatrix} L_x \\ L_y \\ L_z \end{bmatrix} \begin{bmatrix} m_{11} & m_{12} & 0 \\ 0 & m_{22} & m_{23} \\ m_{13} & 0 & m_{33} \end{bmatrix} \begin{bmatrix} L_x \\ L_y \\ L_z \end{bmatrix} + {}^t\begin{bmatrix} L_x \\ L_y \\ L_z \end{bmatrix} \cdot \begin{bmatrix} m_{19} \\ m_{29} \\ m_{39} \end{bmatrix}$$

$$= \{L_x(m_{11}L_x + m_{12}L_y) + L_y(m_{22}L_y + m_{23}L_z) +$$
$$L_z(m_{13}L_x + m_{33}L_z)\} + \{m_{19}L_x + m_{29}L_y + m_{39}L_z\}$$

Further, $(VM_{22}V+VM_{32}N)$ is comprised of 12 multiplication operations and eight addition operations in the same way as the above.

Figure 9:
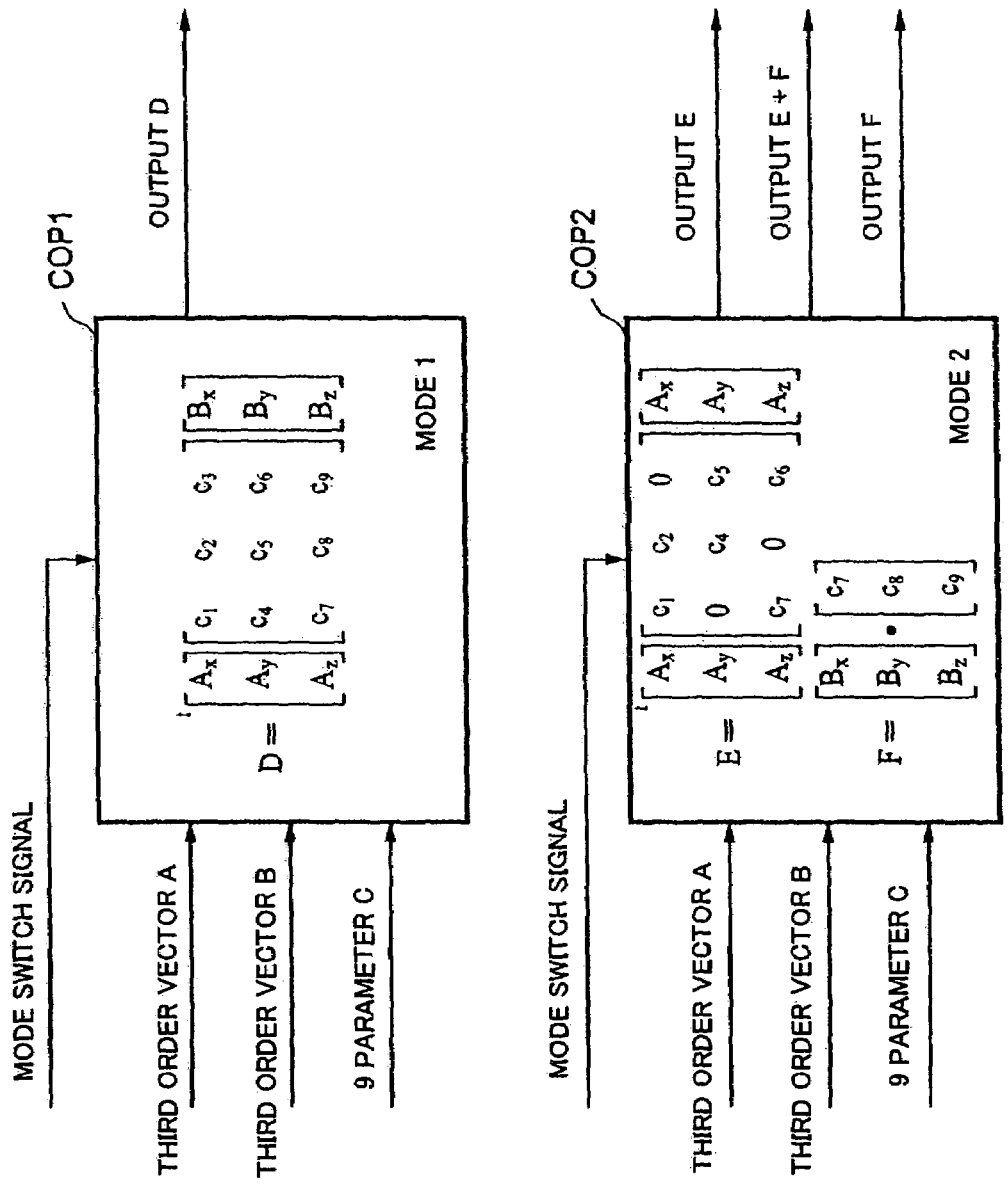
FIG. 9 is a view for explaining a preferred example of operators for efficiently performing processing for evaluation of a BRDF of the present invention.

That is, three types of operations, that is, $LM_{21}V$, $(LM_{11}L+LM_{31}N)$, and $(VM_{22}V+VM_{32}N)$, may be carried out by the composition operation units COP1 and COP2 as shown in FIG. 9 having a first mode and second mode using combinations of the same amount of operation units by selecting either one from among these three types.

Figure 10:
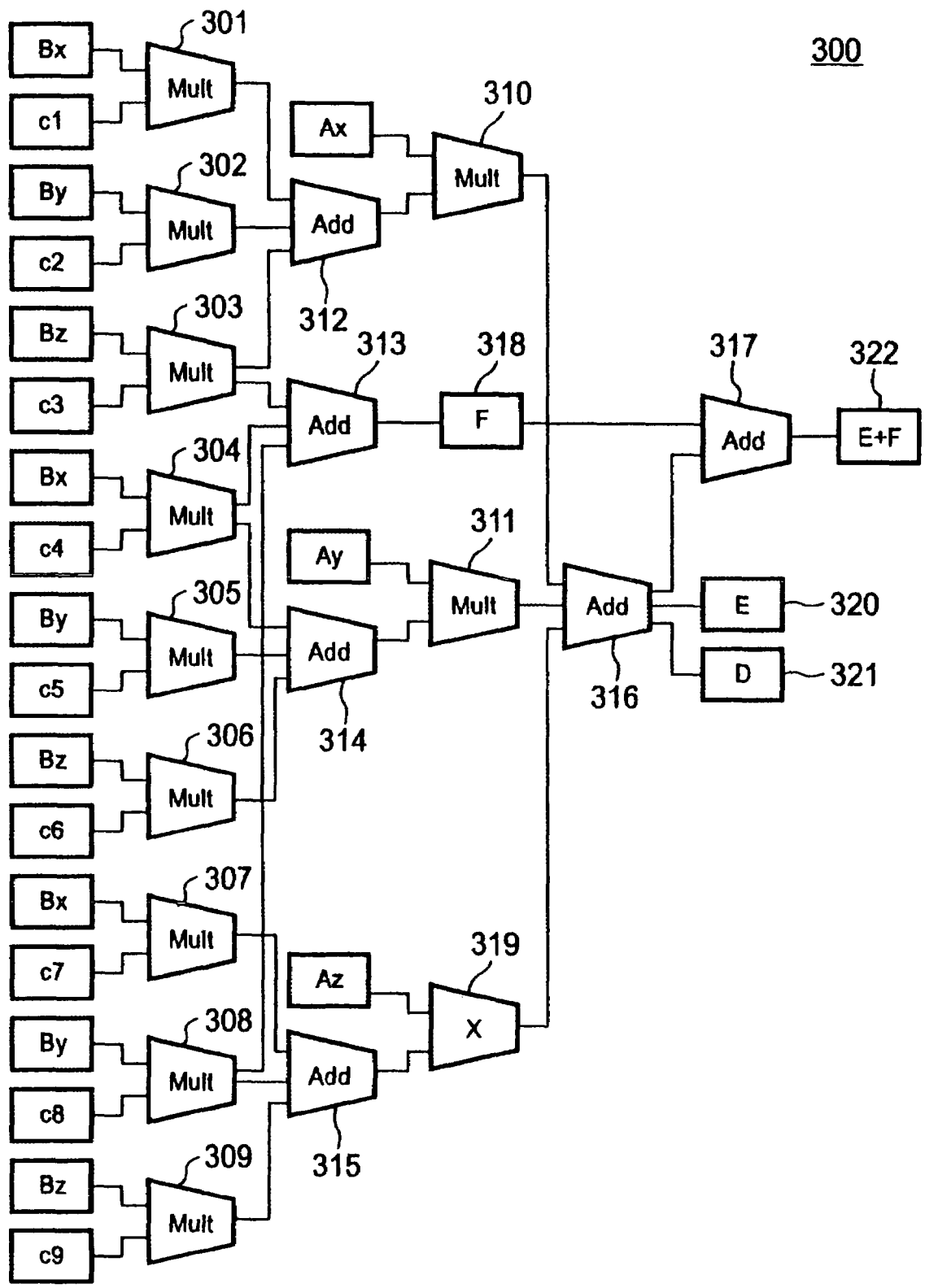
FIG. 10 is a view of an example of an operation circuit for realizing FIG. 9.

FIG. 10 is a view of an example of the operation circuit for realizing FIG. 9.

This operation circuit 300 is configured by, as shown in FIG. 10, connecting the multipliers 301 to 311, the adders 312 to 317, and the registers 318 to 322 in a tree.

This operation circuit 300 can operate in a first mode and a second mode.

In the first mode, it performs an operation by a circuit configuration excluding the adders 313 and 317 and the registers 318, 320, and 322.

In the second mode, it performs an operation by a circuit configuration excluding the output of the multiplier 304 to the adder 314, the output of the multiplier 308 to the adder 315, and the register 321.

In this way, the operation circuit 300 can realize the operations of the first mode and the second mode using the same operation circuit by just changing part of the interconnects.

Shift-Variant BRDF

Figure 11:
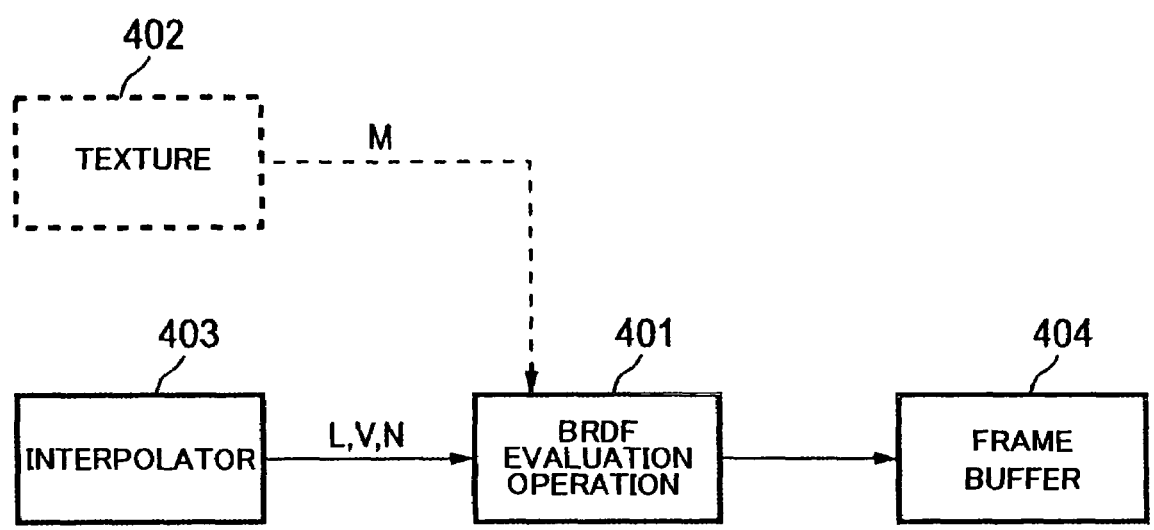
FIG. 11 is a view for explaining an example of forming a texture map having a matrix M as texels, looking up the matrix M from the texture map at the time of execution, and using this as the parameter of the BRDF of the present invention.

As shown in FIG. 11, a texture map is formed using the matrix M as the texels. At the time of execution, the matrix M is looked up from the texture map and used as a parameter of the BRDF of the present invention.

In this case, the matrix M is supplied from a texture map 402 to a BRDF evaluation operation unit 401, while the vectors L, V, and N are supplied from an interpolator 403. Then, the operation result of the BRDF evaluation operation unit 401 is stored in a frame buffer 404.

For the sampling problem of the texture map generated due to the scaling of the surface to be drawn with respect to the view coordinate system, the parameters of the BRDF of the present invention may be converted to a MIPMAP (plurality of resolution textures) in the same way as the conventional method.

The following equation indicates that when a parameter $m_{11-99}$ is sampled n times for a patch $\Omega$ on the surface, the value obtained by averaging the BRDF of the present invention calculated for the patch region and the result of calculation of the BRDF of the present invention using the parameters averaged for the same patch region are equal.

$$\frac{1}{n}\sum_{i,j\in\Omega} quadBRDF(m_{11-99}(u_i, v_j)) = quadBRDF\left(\frac{1}{n}\sum_{i,j\in\Omega} m_{11-99}(u_i, v_j)\right) \quad (31)$$

That is, by using the conventional MIPMAP and bi-linear and tri-linear filtering, the above sampling problem can be solved.

Method for Acquiring Parameters and Calculating Power Utilizing Index Map

It may also be considered to use the index colors which have been used in conventional texture mapping to obtain a table indexing parameters of the BRDF model of the present invention and a conversion table for calculating the power and refer to this.

Figure 12:
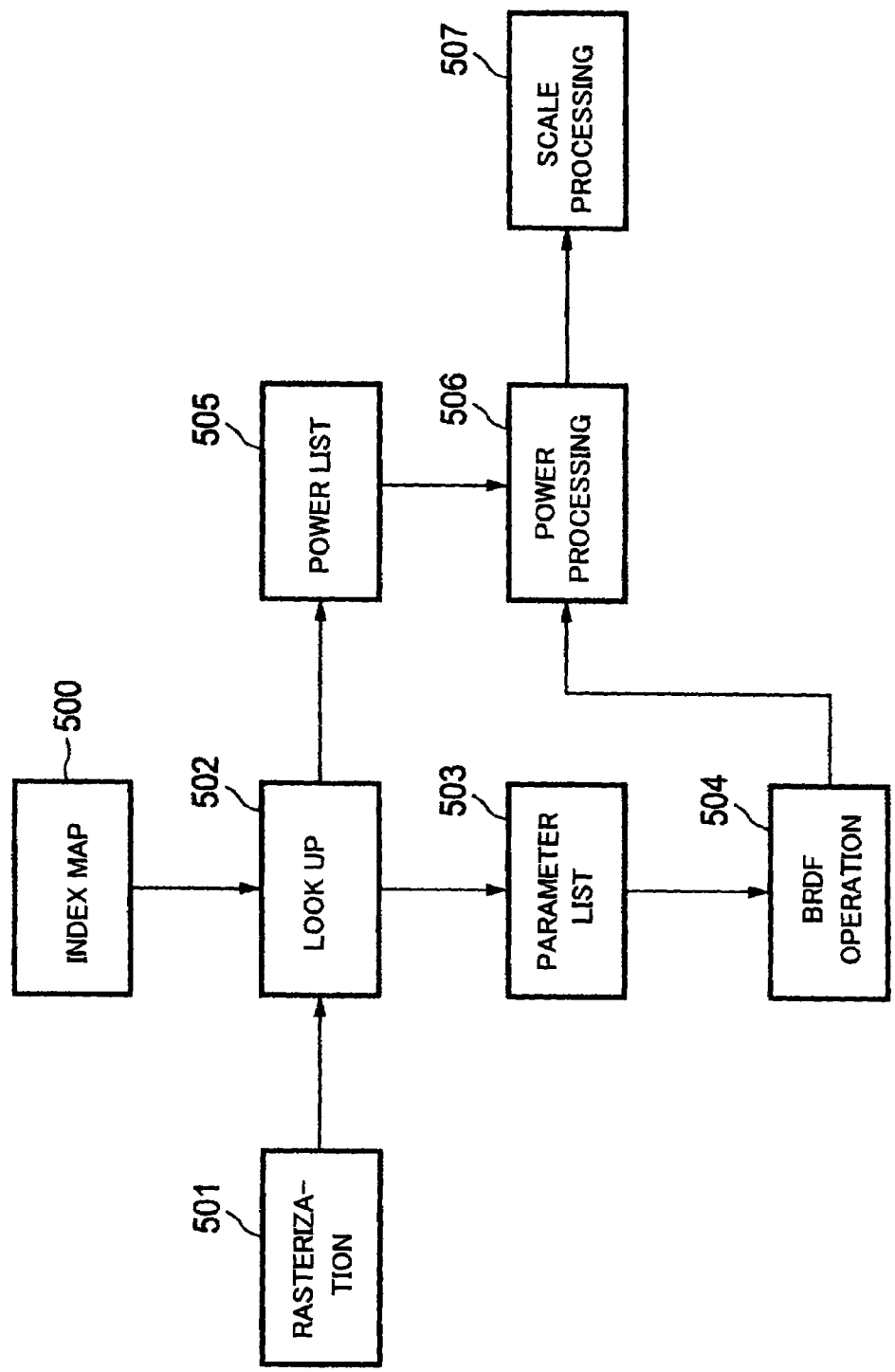
FIG. 12 is a view of the configuration of a logical circuit using an index map.

FIG. 12 is a view of the configuration of a logical circuit using an index map. FIG. 12 shows the logical block 200 of FIG. 5 explained in the above concrete embodiment but made more generalized in configuration.

In FIG. 12, 500 indicates an index map, 501 a rasterization unit, 502 a lookup unit, 503 a parameter list, 504 a BRDF operation unit, 505 a power list, 506 a power processing unit, and 507 a scale processing unit.

An index corresponding to a location on the surface of a generated object is looked up from the index map 500 by the lookup unit 502 to obtain the parameters and power list corresponding to that index. The obtained parameters are used for calculation of the BRDF of the present invention. The power value of the evaluation result of the BRDF of the present invention is obtained by referring to a value corresponding to the evaluation result from the power list and performing appropriate interpolation. The result becomes the intended power value.

Method of Calculation of Parameters of BRDF of Present Invention

Figure 13:
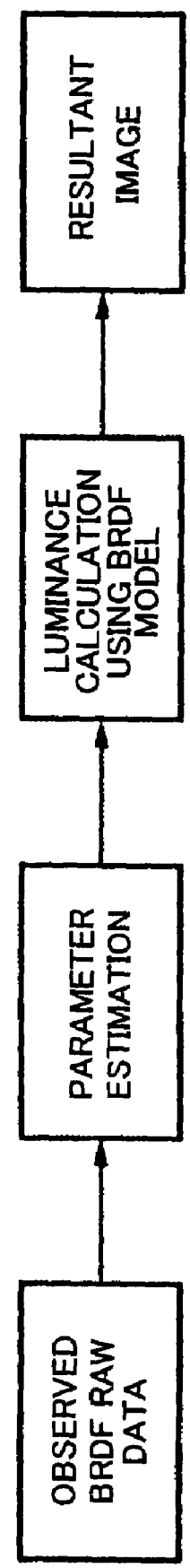
FIG. 13 is a view for explaining a method of calculation of parameters of a BRDF of the present invention.

As shown in FIG. 13, the parameters used in the BRDF of the present invention can be obtained from BRDF raw data obtained by observing the characteristics of clothing, skin, or other material in the real world by a special device or BRDF raw data obtained as a result of calculation of the reflection characteristics of these materials by simulation.

Below, an explanation will be given of a method of finding the parameters to be used in the BRDF of the present invention from the BRDF raw data. When a reflectivity $r_{(k)}$ of raw BRDF data corresponding to the light source direction $L_{(k)}$ and the viewpoint direction $V_{(k)}$ is known, the parameter M is applied to the BRDF model of the present invention as an unknown number.

$$r_{(k)} = {}^t\begin{bmatrix} L_{(k)} \\ V_{(k)} \\ N \end{bmatrix} \begin{bmatrix} M_{11} & M_{21} & M_{31} \\ 0 & M_{22} & M_{32} \\ 0 & 0 & M_{33} \end{bmatrix} \begin{bmatrix} L_{(k)} \\ V_{(k)} \\ N \end{bmatrix} \quad (32)$$

If developing this equation, the following polynomial is obtained.

$$r_{(k)} = m_{11}w_{(k),11} + m_{12}w_{(k),12} + \ldots + m_{99}w_{(k),99} \quad (33)$$

Here, $w_{(k),11-99}$ is the multiplier corresponding to the unknown number $m_{11-99}$ obtained from $L_{(k)}$, $V_{(k)}$, and N. When there are n number of sets of observation data, n number of equations comprised of the above equations are obtained. If a coefficient $m_{11-99}$ satisfying these n number of equations best is found, the parameter M can be found.

In order to find this, it is possible to use least square approximation so as to make the average of the squares of the difference between values of the two sides of the above equation as small as possible.

Method of Simply Creating Specular Component from Polynomial Texture Map Parameters The effect of the specular component which can be used in the BRDF of the present invention can be simply created from polynomial texture map parameters.

Figure 14:
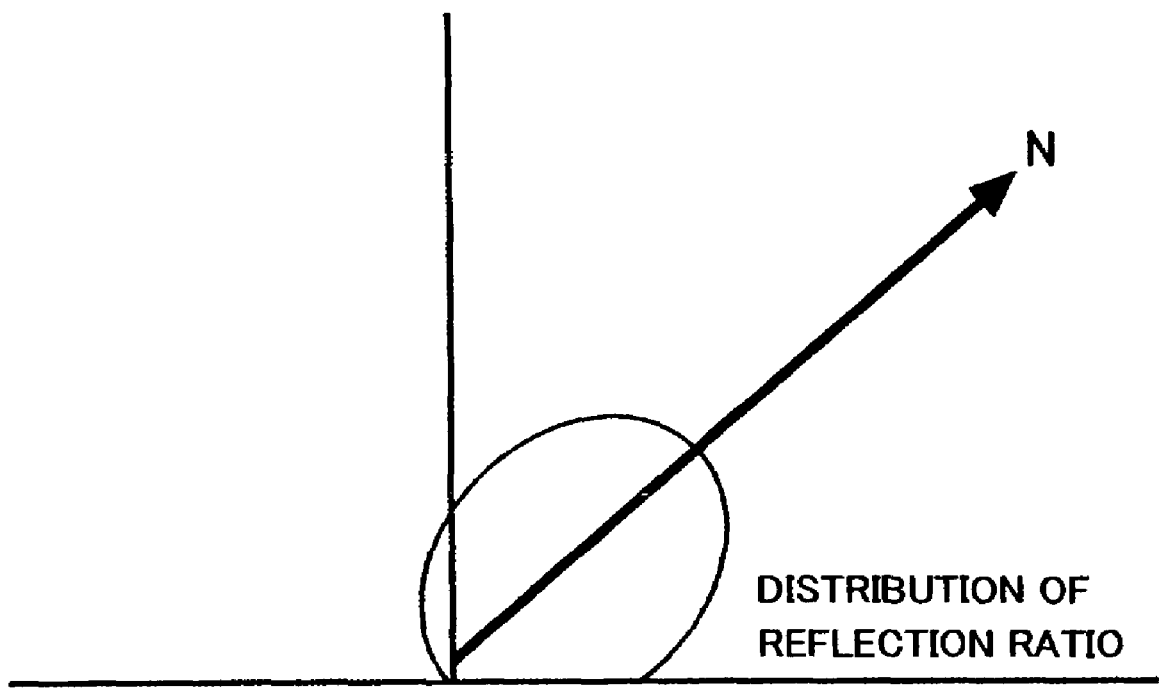
FIG. 14 is a view for explaining an assumption that a diffuse reflectivity distribution corresponding to a light source direction and a specular reflectivity distribution corresponding to a half vector direction are the same.

First, assume that the following two distributions are the same (refer to FIG. 14).

Namely, there are a diffuse reflectivity distribution corresponding to the light source direction and a specular reflectivity distribution corresponding to the half vector direction.

From this assumption, the effect of the specular component can be created by the following equation:

$$I = PTM(L) + k \cdot PTM(H)^n \quad (34)$$

Here, PTM is the evaluation formula of the polynomial texture map model.

The second term on the right side of the above equation can be written in more detail as follows:

$$PTM(H; a_0 \ldots a_5) = {}^t\begin{bmatrix} H_x \\ H_y \\ 1 \end{bmatrix} \begin{bmatrix} a_0 & a_2 & a_3 \\ 0 & a_1 & a_4 \\ 0 & 0 & a_5 \end{bmatrix} \begin{bmatrix} H_x \\ H_y \\ 1 \end{bmatrix} \quad (35)$$

$$= {}^t\begin{bmatrix} L_x + V_x/2 \\ L_y + V_y/2 \\ 1 \end{bmatrix} \begin{bmatrix} a_0 & a_2 & a_3 \\ 0 & a_1 & a_4 \\ 0 & 0 & a_5 \end{bmatrix} \begin{bmatrix} L_x + V_x/2 \\ L_y + V_y/2 \\ 1 \end{bmatrix}$$

When inserting this equation in the parameter matrix of the BRDF of the present invention, the result is as follows:

$$PTM(H; a_0 \ldots a_5) = quadBRDF_{PTM(H)}(L, V, N; a_0 \ldots a_5) \quad (36)$$

$$= {}^t\begin{bmatrix} L_x \\ L_y \\ L_z \\ V_x \\ V_y \\ V_z \\ 0 \\ 0 \\ 1 \end{bmatrix} \begin{bmatrix} a_0/4 & a_2/4 & 0 & a_0/2 & a_2/4 & 0 & 0 & 0 & a_3/2 \\ 0 & a_1/4 & 0 & a_2/4 & a_1/2 & 0 & 0 & 0 & a_4/2 \\ 0 & 0 & 0 & 0 & 0 & 0 & 0 & 0 & 0 \\ 0 & 0 & 0 & a_0/4 & a_2/4 & 0 & 0 & 0 & a_3/2 \\ 0 & 0 & 0 & 0 & a_1/4 & 0 & 0 & 0 & a_4/2 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & a_5 \end{bmatrix} \begin{bmatrix} L_x \\ L_y \\ L_z \\ V_x \\ V_y \\ V_z \\ 0 \\ 0 \\ 1 \end{bmatrix}$$

With the above as it is, the effect is the same as giving a half vector to the polynomial texture map.

However, if giving appropriate change to the parameters by utilizing a pseudo normal direction or the like obtained from the above parameters, anistropy or another effect may be obtained. The BRDF model of the present invention is advantageous for future expanded effects.

Summarizing the above, the evaluation result using the simple specular effect is found by the following equation:

$$I = quadBRDF_{PTM(L)}(L, V, N) + k \cdot quadBRDF_{PTM(H)}(L, V, N)^n \quad (37)$$

As explained above, the BRDF model of the present invention has an effect which cannot be obtained even if combining the effects possessed by conventional shading models.

In the section on "correspondence with conventional models", the correspondence between the conventional shading algorithm Lafortune-BRDF or polynomial texture maps etc. and the BRDF model of the present invention is explained. When determining an appropriate parameter M according to the explanation here, equivalent effects to those by the conventional shading can be rendered by the BRDF model of the present invention.

In color engineering, it is generally known that the effects of individual light may be added in order to superimpose the effects of different light. The BRDF model of the present invention has linearity and enables superimposition of effects by adding different parameters M.

However, no matter how the parameters M corresponding to the conventional shading algorithm are combined by weighted addition, the space of the parameters M of the BRDF model of the present invention cannot be completely filled.

Accordingly, the BRDF model of the present invention has a new effect which does not exist in the conventional shading models.

Further, a case where the algorithm of the present invention is designed based on the conventional circuit will be considered.

When comparing this with the general purpose operation unit, the operation unit of FIG. 9 (concretely FIG. 10) is specified so as to be able to efficiently process two operation modes peculiar to the BRDF of the present invention. Accordingly, more efficient processing can be carried out than the case where this is processed by a general purpose operation unit.

Further, this is compared with a register combiner which is a special operation unit provided in the graphics processor of NVIDIA as a special operation unit.

Figure 1:
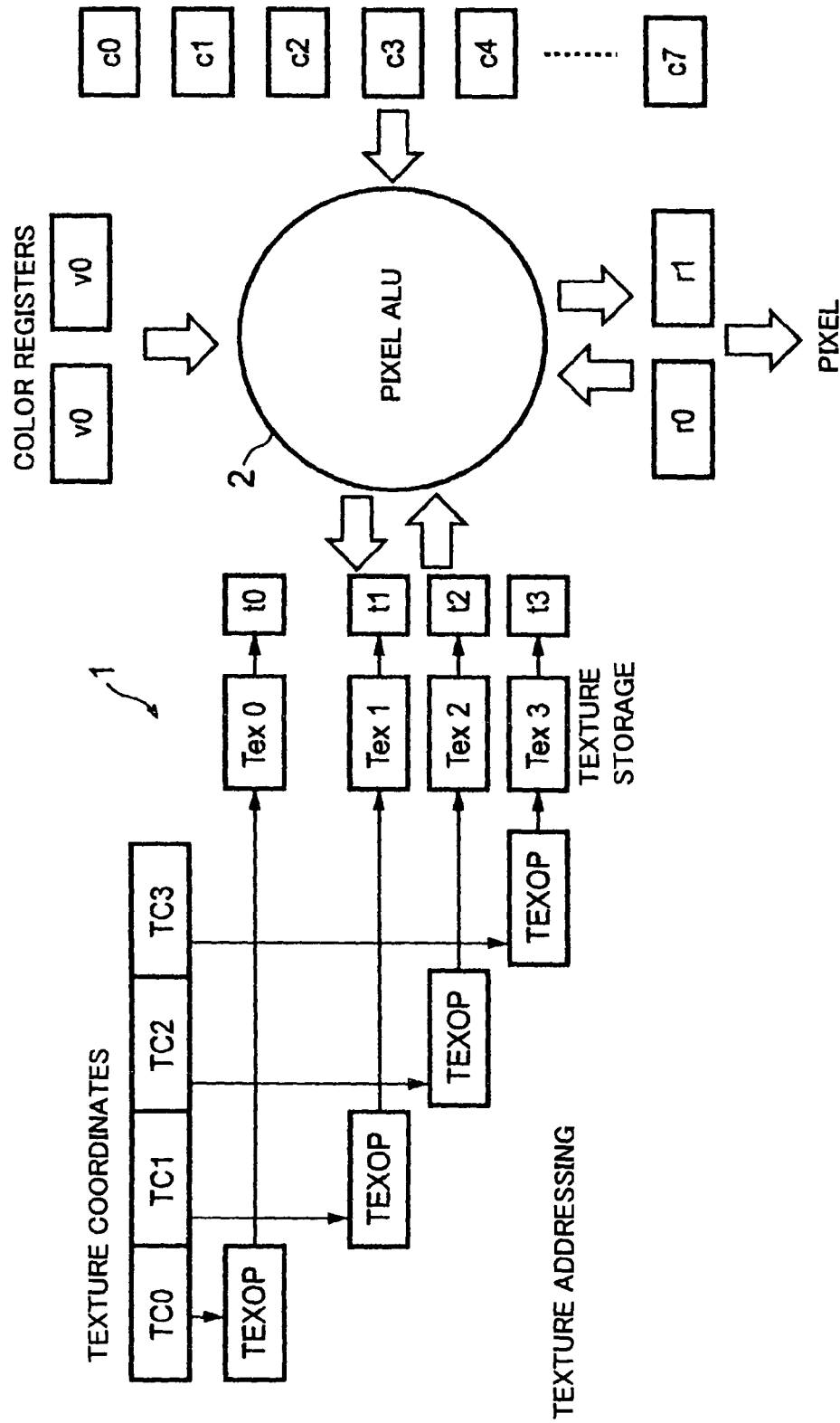
FIG. 1 is a view for explaining a mechanism of a conventional programmable pixel shader.
Figure 2:
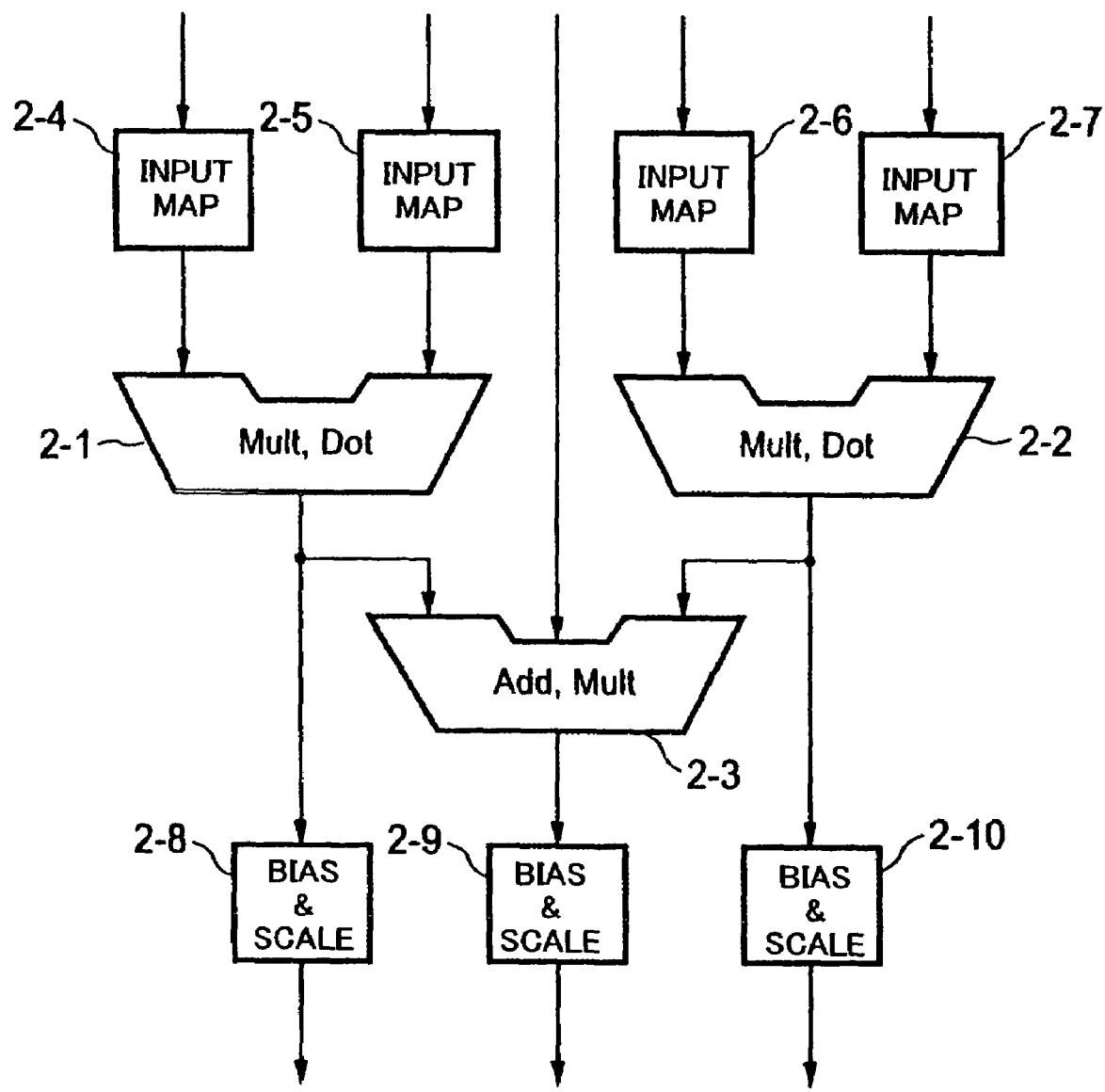
FIG. 2 is a view of the concrete configuration of a pixel ALU of FIG. 1.

The configuration inside the register combiner more detailed than FIG. 2 is not clear. However, even if considered with the degree of detail of FIG. 2, the inefficiency of a register combiner is clear.

Figure 15:
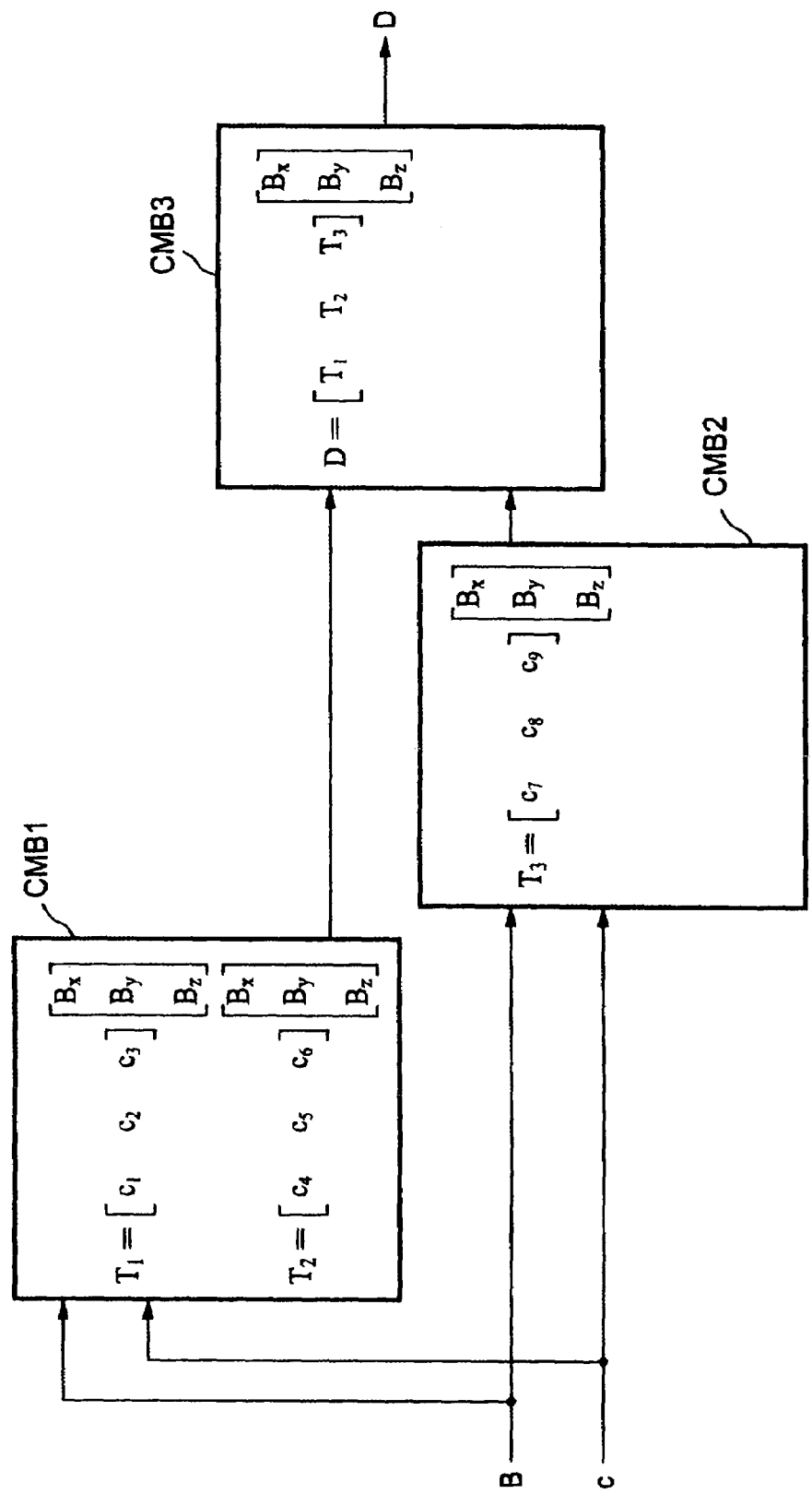
FIG. 15 is a view of an example of a configuration realizing a function of a first mode of FIG. 9 by using a register combiner of FIG. 2.

FIG. 15 shows the function of the first mode of FIG. 9 realized by using the register combiner of FIG. 2.

Figure 16:
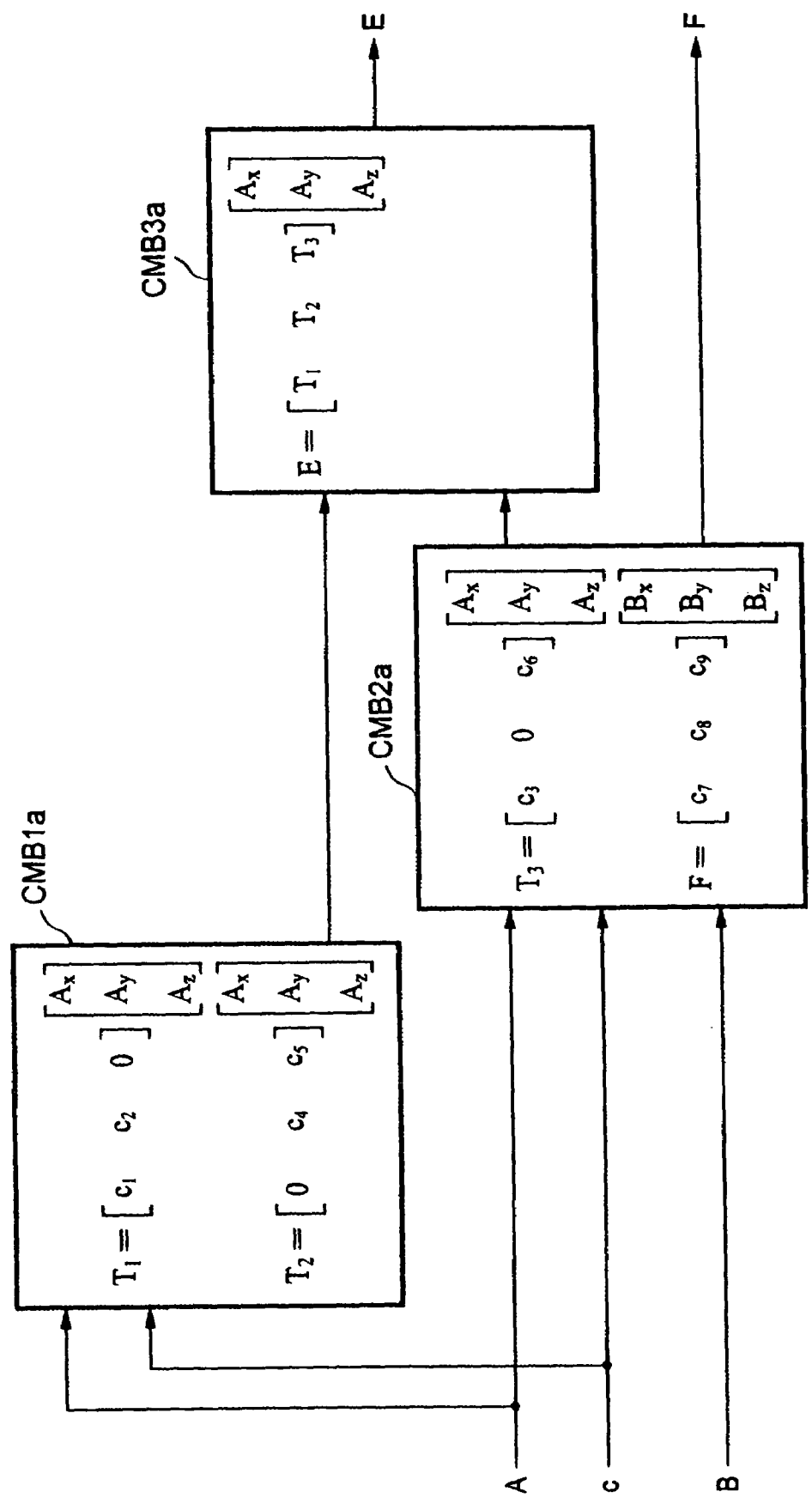
FIG. 16 is a view of an example of a configuration realizing a function of a second mode of FIG. 9 by using the register combiner of FIG. 2.

Further, FIG. 16 shows the function of the second mode of FIG. 9 realized by using the register combiner of FIG. 2. It is necessary to combine these three register combiners CMB1 to CMB3 in three stages in this case.

Irrespective of the fact that the operations of the first two stages among three stages can be performed at the same time, the operations must be carried out divided into two steps. Therefore, the delay in the calculations is large. Further, in the first mode, the efficiency of utilization of the operation circuit in two register combiners among the three is halved.

The efficiency of utilization of the operation circuit in one register combiner among the three is halved in the second mode.

Accordingly, it is inefficient if the BRDF model of the present invention is processed by the register combiner as the prior art.

As described above, as explained above, the present invention uses a generalized model of the shading models conventionally used for real time applications, so can exhibit the effects equivalent to those by the conventional models. Further, it can exhibit unique effects provided by this model.

From BRDF raw data found by observing real materials such as the clothing and skin or by simulation, the parameters for the BRDF model according to the present invention can be generated. Further, it is also possible to obtain the parameters of the BRDF according to the present invention using the parameters of conventional models such as polynomial texture maps as materials.

The BRDF according to the present invention is obtained by modeling a BRDF by a quadratic-form matrix expression, so the model can be evaluated by just product-sum operations. If breaking down the BRDF according to the present invention to the form of polynomials comprised of sub matrixes, calculation of unrequired terms can be omitted. By this, the tradeoff between the expression power and the calculation efficiency can be adjusted.

Further, since this is the model comprised of vectors and a matrix, a vector operation unit can be used for efficient operation.

The form of expression is compact compared with conventional BRDF expression frequently using table reference. Further, since the tradeoff between the expression power and the calculation efficiency can be adjusted, processing by a further compact form of expression is possible.

Due to this compactness, it is easy to combine this with texture mapping for obtaining a shift-variant format. The parameter M of the model may be stored in the table and looked up at the time of execution.

Since the BRDF was modeled with a quadratic-form matrix expression, so long as hardware designed especially for a general vector and/or matrix operation is used, this model can be efficiently evaluated. The BRDF according to the present invention does not need a special circuit for evaluation of the model. However, if there is the already explained composition operation unit, the BRDF according to the present invention can be further efficiently processed.

While the invention has been described with reference to specific embodiments chosen for purpose of illustration, it should be apparent that numerous modifications could be made thereto by those skilled in the art without departing from the basic concept and scope of the invention.

What is claimed is:

1. An image processing apparatus for finding reflectivity based on a bi-directional reflection distribution function (BRDF) model expressing a ratio of reflection of light incident upon one point of a surface of an object to be drawn at the object surface, comprising:
a first operation means for outputting a direction of a light source and a direction of a viewpoint; and
a second operation means for calculating said reflectivity based on a BRDF model calculated by a quadratic-form matrix expression having the form of $$ {}^t\begin{bmatrix} L \\ V \\ N \end{bmatrix} [M] \begin{bmatrix} L \\ V \\ N \end{bmatrix} $$

wherein L is a vector corresponding to a light source direction vector representing the direction of the light source, V corresponds to a viewpoint direction vector representing the direction of the viewpoint, N corresponds to a normal direction vector, and M is a matrix corresponding to a parameter for determining the characteristics of the BRDF model.

2. An image processing apparatus as set forth in claim 1, wherein said vector comprised of the light source direction, the viewpoint direction, and the normal direction is one of a three-dimensional vector expressing directions, a quaternion, and a pole coordinate.

3. An image processing apparatus as set forth in claim 1, wherein said vector comprised of the light source direction, the viewpoint direction, and the normal direction is obtained by regressing the order by using an appropriate linear conversion.

4. An image processing apparatus as set forth in claim 1, wherein said vector comprised of the light source direction, the viewpoint direction, and the normal direction is obtained by converting these vectors by any elementary operation, table reference, or combination of the same.

5. An image processing apparatus as set forth in claim 1, wherein said second operation means divides the matrix determining the characteristics of the BRDF model calculated by the quadratic-form matrix expression into sub matrixes and performs an evaluation operation using a polynomial comprised of a quadratic form of the divided sub matrixes.

6. An image processing apparatus as set forth in claim 1, wherein said second operation means calculates a quadratic form by the procedure of multiplying the matrix with the vectors, then multiplying the vectors with each other.

7. An image processing apparatus as set forth in claim 1, wherein said second operation means combines evaluation results of one or more of said BRDF models by selectively using addition/subtraction, multiplication, division, cumulative multiplication, and the quadratic form.

8. An image processing apparatus as set forth in claim 1, wherein said second operation means has a composite operation unit for calculating said BRDF model having two operation modes of a matrix operation equation comprised of two different vectors and a sum of the quadratic-form matrix including a triangle matrix and vector multiplication.

9. An image processing apparatus as set forth in claim 1, wherein said second operation means gives the matrix determining the characteristics of said BRDF model using a texture map.

10. An image processing apparatus as set forth in claim 1, wherein said second operation means interpolates elements of the matrix determining the characteristics of the BRDF model based on MIPMAP processing including predetermined filtering.

11. An image processing apparatus as set forth in claim 1, wherein said second operation means refers to the matrix determining the characteristics of the BRDF model from an indexed table.

12. An image processing apparatus as set forth in claim 1, wherein said second operation means obtains the matrix determining the characteristics of the BRDF model by solving an equation comprised of a plurality of polynomials obtained by entering a plurality of BRDF raw data given in advance into said BRDF model.

13. An image processing apparatus as set forth in claim 1, wherein said second operation means forms the matrix determining the characteristics of the BRDF model from the parameters of a polynomial texture map by a correspondence obtained by assuming that a diffuse reflectivity distribution corresponding to the light source direction is the same as a specular reflectivity distribution corresponding to a half vector direction.

14. An image processing method for finding reflectivity based on a bi-directional reflection distribution function (BRDF) model expressing a ratio of reflection of light incident upon one point of a surface of a generated object at the object surface, comprising:
calculating said reflectivity based on a BRDF model calculated by a quadratic-form matrix expression having the form of $$ {}^t\begin{bmatrix} L \\ V \\ N \end{bmatrix} [M] \begin{bmatrix} L \\ V \\ N \end{bmatrix} $$

wherein L is a vector corresponding to a light source direction vector representing the direction of the light source, V corresponds to a viewpoint direction vector representing the direction of the viewpoint, N corresponds to a normal direction vector, and M is a matrix corresponding to a parameter for determining the characteristics of the BRDF model.

15. An image processing method as set forth in claim 14, wherein said vector comprised of the light source direction, the viewpoint direction, and the normal direction is one of a three-dimensional vector expressing directions, a quaternion, and a pole coordinate.

16. An image processing method as set forth in claim 14, wherein said vector comprised of the light source direction, the viewpoint direction, and the normal direction is obtained by regressing the order by using an appropriate linear conversion.

17. An image processing method as set forth in claim 14, wherein said vector comprised of the light source direction, the viewpoint direction, and the normal direction is obtained by converting these vectors by any elementary operation, table reference, or combination of the same.

18. An image processing method as set forth in claim 14, comprising dividing the matrix determining the characteristics of the BRDF model calculated by the quadratic-form matrix expression into sub matrixes and performing an evaluation operation using a polynomial comprised of a quadratic form of the divided sub matrixes.

19. An image processing method as set forth in claim 14, wherein said quadratic form performs calculation by the procedure of multiplying the matrix with the vectors, then multiplying the vectors with each other.

20. An image processing method as set forth in claim 14, comprising combining evaluation results of one or more of said BRDF models by selectively using addition/subtraction, multiplication, division, cumulative multiplication, and the quadratic form.

21. An image processing method as set forth in claim 14, comprising calculating said BRDF model by a composite operator having two operation modes of a matrix operation equation comprised of two different vectors and a sum of the quadratic-form matrix including a triangle matrix and vector multiplication.

22. An image processing method as set forth in claim 14, comprising giving the matrix determining the characteristics of said BRDF model by using a texture map.

23. An image processing method as set forth in claim 14, comprising interpolating elements of the matrix determining the characteristics of the BRDF model based on MIPMAP processing including predetermined filtering.

24. An image processing method as set forth in claim 14, comprising referring to the matrix determining the characteristics of the BRDF model from an indexed table.

25. An image processing method as set forth in claim 14, comprising obtaining the matrix determining the characteristics of the BRDF model by solving an equation comprised of a plurality of polynomials obtained by entering a plurality of BRDF raw data given in advance into said BRDF model.

26. An image processing method as set forth in claim 14, comprising forming the matrix determining the characteristics of the BRDF model from the parameters of a polynomial texture map by a correspondence obtained by assuming that a diffuse reflectivity distribution corresponding to the light source direction is the same as a specular reflectivity distribution corresponding to a half vector direction.

* * * * *